(12) United States Patent
Kawata et al.

(10) Patent No.: US 12,412,166 B2
(45) Date of Patent: Sep. 9, 2025

(54) MOBILE SALES SYSTEM AND SERVER DEVICE

(71) Applicant: Toshiba Tec Kabushiki Kaisha, Tokyo (JP)

(72) Inventors: Kento Kawata, Fujisawa Kanagawa (JP); Morito Natsume, Tokyo (JP); Mikio Ito, Tokyo (JP); Taro Ando, Izunokuni Shizuoka (JP); Takahide Matsumoto, Tokyo (JP); Ai Hirai, Tokyo (JP); Kizuku Inoue, Yokohama Kanagawa (JP); Tsuyoshi Nakai, Nara Nara (JP); Yumiko Okuma, Tokyo (JP); Mayuko Tsunoda, Yokohama Kanagawa (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 232 days.

(21) Appl. No.: 18/157,564

(22) Filed: Jan. 20, 2023

(65) Prior Publication Data

US 2023/0267443 A1    Aug. 24, 2023

(30) Foreign Application Priority Data

Feb. 22, 2022    (JP) .................................. 2022-025950

(51) Int. Cl.
    *G06Q 20/32*    (2012.01)
    *G06Q 20/20*    (2012.01)
    *G06Q 30/0601*  (2023.01)

(52) U.S. Cl.
    CPC ....... *G06Q 20/3224* (2013.01); *G06Q 20/206* (2013.01); *G06Q 20/3223* (2013.01); *G06Q 30/0639* (2013.01)

(58) Field of Classification Search
    CPC ............ G06Q 20/3224; G06Q 20/206; G06Q 20/3223; G06Q 30/0639; G06Q 20/18;
(Continued)

(56) References Cited

U.S. PATENT DOCUMENTS 10,216,188 B2 * 2/2019 Brady ................ G06Q 10/0837
10,636,019 B1 * 4/2020 Abrons .............. G06Q 30/0207
(Continued)

FOREIGN PATENT DOCUMENTS

CN      101069219 A * 11/2007 ............ G07F 11/002
CN      108629896 A * 10/2018 ............ G06Q 20/18
(Continued)

OTHER PUBLICATIONS

Japanese Office Action dated May 27, 2025, mailed in counterpart Japanese Application No. 2022-025950, 8 pages.

*Primary Examiner* — Ashford S Hayles
(74) *Attorney, Agent, or Firm* — Kim & Stewart LLP

(57) ABSTRACT

According to one embodiment, a mobile sales system includes a terminal device and a mobile sales device on which items to be sold can be mounted. The terminal device is used to designate a customer call position for the mobile sales device and is configured to transmit position information indicating the customer call position. The mobile sales device is configured to acquire the position information transmitted by the terminal device, move to a location corresponding to the acquired position information, and execute payment processing for an item removed from the mobile sales device by a customer.

20 Claims, 24 Drawing Sheets

(58) Field of Classification Search
CPC .... G06Q 20/20; G06Q 20/202; G06Q 20/322; G06Q 20/40145; G06Q 30/06; G06Q 30/0601; G07F 9/001; G07F 9/002; G07F 11/00; G07F 11/04; G07G 1/0045
See application file for complete search history.

(56) References Cited

U.S. PATENT DOCUMENTS

| | | | |
|---|---|---|---|
| 10,748,143 B2 * | 8/2020 | Edgington | G06Q 20/405 |
| 11,270,257 B2 | 3/2022 | Nakagawa | |
| 11,392,864 B2 | 7/2022 | Qiu | |
| 11,488,212 B2 | 11/2022 | Kobayashi | |
| 11,501,523 B2 | 11/2022 | Li | |
| 11,556,976 B2 | 1/2023 | Kobayashi | |
| D1,039,580 S * | 8/2024 | Huang | D15/199 |
| 2008/0306826 A1 * | 12/2008 | Kramer | G06Q 30/0226 705/14.27 |
| 2009/0248574 A1 * | 10/2009 | Leung | G06Q 20/10 705/39 |
| 2014/0012622 A1 * | 1/2014 | Kamiya | G06Q 30/0201 705/7.29 |
| 2014/0136414 A1 * | 5/2014 | Abhyanker | G06Q 20/3224 701/25 |
| 2014/0143061 A1 * | 5/2014 | Abhyanker | G06Q 50/01 705/14.58 |
| 2016/0232489 A1 * | 8/2016 | Skaaksrud | G06Q 10/0836 |
| 2017/0011580 A1 * | 1/2017 | Huang | G06Q 30/0631 |
| 2017/0018041 A1 * | 1/2017 | Fox | G06Q 20/3224 |
| 2017/0132934 A1 * | 5/2017 | Kentley | G05D 1/0088 |
| 2017/0200197 A1 * | 7/2017 | Brubaker | B60Q 1/2619 |
| 2018/0053369 A1 * | 2/2018 | High | G07F 9/0235 |
| 2018/0099602 A1 * | 4/2018 | Salter | B60Q 1/507 |
| 2018/0164818 A1 * | 6/2018 | Wilkinson | G06V 20/584 |
| 2018/0215543 A1 * | 8/2018 | Lert, Jr. | G06Q 10/08 |
| 2018/0246513 A1 * | 8/2018 | Cronin | G07F 9/001 |
| 2018/0259973 A1 * | 9/2018 | Maruo | G05D 1/0011 |
| 2018/0260778 A1 * | 9/2018 | Mazetti | G06Q 10/0875 |
| 2018/0267963 A1 * | 9/2018 | Ogata | G06Q 30/0269 |
| 2018/0349872 A1 * | 12/2018 | Ahmed | G07G 1/0036 |
| 2019/0034858 A1 * | 1/2019 | Ferguson | G05D 1/6445 |
| 2019/0035044 A1 * | 1/2019 | Ferguson | G05D 1/6445 |
| 2019/0049988 A1 * | 2/2019 | Meij | G06Q 50/12 |
| 2019/0051083 A1 * | 2/2019 | Goldberg | G07F 9/026 |
| 2019/0051090 A1 * | 2/2019 | Goldberg | B62D 63/04 |
| 2019/0236534 A1 * | 8/2019 | Kaneko | G05D 1/0274 |
| 2020/0105085 A1 * | 4/2020 | Jafa | G08G 1/202 |
| 2020/0209821 A1 * | 7/2020 | Heinla | G05B 19/4155 |
| 2020/0301433 A1 * | 9/2020 | Katayama | G06Q 20/145 |
| 2020/0364655 A1 * | 11/2020 | Burris | G07F 7/025 |
| 2021/0094506 A1 * | 4/2021 | Baker | B60R 25/241 |
| 2021/0150511 A1 * | 5/2021 | Mandloi | G06Q 20/40145 |
| 2021/0295635 A1 * | 9/2021 | Matsunami | H04W 4/40 |
| 2021/0302971 A1 * | 9/2021 | Cousins | G05D 1/0094 |
| 2021/0303105 A1 * | 9/2021 | Yoneyama | G06Q 10/06312 |
| 2021/0330119 A1 * | 10/2021 | Väin | G07F 13/065 |
| 2022/0004974 A1 * | 1/2022 | Heinla | G05D 1/43 |
| 2022/0012677 A1 * | 1/2022 | Rongley | G06K 7/10297 |
| 2022/0180299 A1 * | 6/2022 | Väin | G06Q 10/087 |
| 2022/0207505 A1 * | 6/2022 | Ahmed | G06Q 20/0855 |
| 2022/0266738 A1 * | 8/2022 | Meador | E05B 49/00 |
| 2022/0415114 A1 * | 12/2022 | Long, II | G07F 9/001 |
| 2023/0144456 A1 * | 5/2023 | Ferguson | G06Q 20/401 705/26.81 |
| 2023/0153886 A1 * | 5/2023 | Arai | G06Q 30/0202 705/26.7 |
| 2023/0184557 A1 * | 6/2023 | Meador | B60P 3/007 705/330 |
| 2023/0186368 A1 * | 6/2023 | Arai | G06Q 30/0261 705/26.7 |
| 2024/0336183 A1 * | 10/2024 | Bolshchikov | G07F 9/001 |

FOREIGN PATENT DOCUMENTS

| | | | | |
|---|---|---|---|---|
| CN | 109035564 A | * | 12/2018 | G07F 9/002 |
| CN | 109670758 A | * | 4/2019 | G06Q 10/083 |
| CN | 110084961 A | * | 8/2019 | |
| CN | 114202328 A | * | 3/2022 | |
| CN | 116524649 A | * | 8/2023 | |
| JP | 2004102694 A | * | 4/2004 | |
| JP | 2004295377 A | | 10/2004 | |
| JP | 2008087892 A | | 4/2008 | |
| JP | 2008123278 A | | 5/2008 | |
| JP | 2011221984 A | * | 11/2011 | |
| JP | 2015069594 A | | 4/2015 | |
| JP | 2020126559 A | | 8/2020 | |
| JP | 2021507203 A | | 2/2021 | |
| JP | 2021033471 A | | 3/2021 | |
| JP | 2021039620 A | | 3/2021 | |
| KR | 20210105527 A | * | 8/2021 | |
| KR | 102406988 B1 | * | 6/2022 | |
| WO | 2018163547 A1 | | 9/2018 | |
| WO | WO-2018191504 A1 | * | 10/2018 | B60Q 1/50 |
| WO | WO-2021100096 A1 | * | 5/2021 | G02B 27/017 |
| WO | WO-2024248205 A1 | * | 12/2024 | G06Q 30/0213 |

* cited by examiner

| MERCHANDISE CODE | MERCHANDISE INFORMATION | | | | | |
|---|---|---|---|---|---|---|
| | MERCHANDISE NAME | TYPE | PRICE | WEIGHT | IMAGE DATA | ... |

| COLUMN ID | MERCHANDISE CODE | QUANTITY | ... |
|---|---|---|---|

| ROBOT ID | POSITION INFORMATION | STATE INFORMATION | ... |

| ROBOT ID | MERCHANDISE CODE | STOCK QUANTITY | ... |

| USER ID | USER INFORMATION | | |
|---|---|---|---|
| | FEATURE INFORMATION | SETTLEMENT INFORMATION | ... |

| TERMINAL ID | CALL DATE AND TIME | CALL POSITION | AUTHENTICATION INFORMATION | ROBOT ID | ARRIVAL DATE AND TIME | ... |

| TRANSACTION ID | ROBOT ID | USER ID | MERCHANDISE CODE | SETTLEMENT FLAG | ... |
|---|---|---|---|---|---|

MOBILE SALES SYSTEM AND SERVER DEVICE

CROSS-REFERENCE TO RELATED APPLICATION

This application is based upon and claims the benefit of priority from Japanese Patent Application No. 2022-025950, filed Feb. 22, 2022, the entire contents of which are incorporated herein by reference.

FIELD

Embodiments described herein relate to a mobile sales system and a server device for a mobile sales system. The mobile sales system includes one or more mobile sales robots or the like which move to customer designated locations to sale merchandise.

BACKGROUND

In the related art, a system including a robot (shopping assistance device) has been proposed. The robot moves in a store that sells merchandise and assists a customer in shopping. The robot in such a system circulates within the store, receives items to be purchased from the customer, and carries the items to a cash register, thereby supporting the shopping performed by the customer.

As described above, the system in the related art only assists the customer while shopping in the store, and construction of a more useful system is desired for a business operator who sells merchandise.

BRIEF DESCRIPTION OF THE DRAWINGS

FIG. 6 is a diagram illustrating an example of a data configuration of a merchandise master according to an embodiment.

FIG. 7 is a diagram illustrating an example of a data configuration of an accommodated merchandise table.

FIG. 10 is a diagram illustrating an example of a data configuration of a robot management table.

FIG. 11 is a diagram illustrating an example of a data configuration of a merchandise management table.

FIG. 12 is a diagram illustrating an example of a data configuration of a user management table.

FIG. 13 is a diagram illustrating an example of a data configuration of a call management table.

FIG. 14 is a diagram illustrating an example of a data configuration of a transaction management table.

DETAILED DESCRIPTION

According to one embodiment, a mobile sales system includes a terminal device and a mobile sales device. Items to be sold can be mounted on the mobile sales device. The terminal device is used to designate a customer call position for the mobile sales device and is configured to transmit position information indicating the customer call position. The mobile sales device is configured to acquire the position information transmitted by the terminal device, move to a location corresponding to the acquired position information, and execute payment processing for an item removed from the mobile sales device by a customer.

Hereinafter, certain example embodiments will be described with reference to drawings. Further, the present disclosure is not limited to the specific example embodiments.

Figure 1:
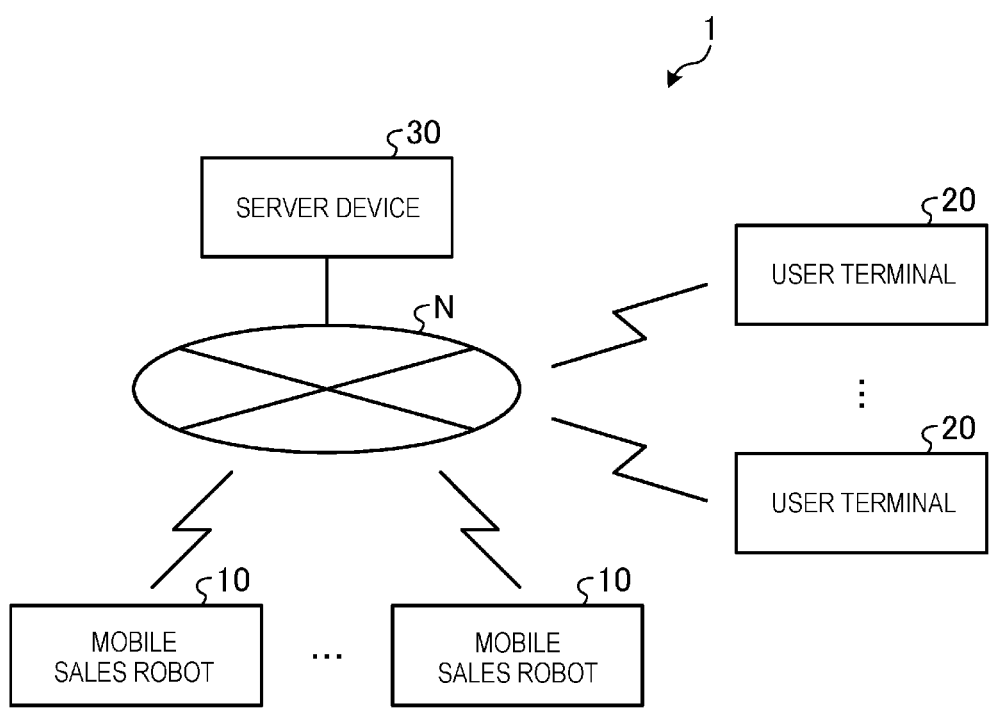
FIG. 1 is a diagram illustrating an example of a mobile sales system according to an embodiment.

FIG. 1 is a diagram illustrating an example of a configuration of a mobile sales system according to an embodiment. As illustrated in FIG. 1, a mobile sales system 1 includes a mobile sales robot 10, user terminals 20, and server devices 30. The mobile sales robot 10, the user terminals 20, and the server devices 30 are connected to a network N such as a local area network (LAN).

The mobile sales robot 10 is a self-propelled sales device that transports and sells an item of merchandise. The mobile sales robot 10 is an example of a mobile sales device. For example, the mobile sales robot 10 travels within a predetermined range or area such as a shopping mall, and sells merchandise at various positions within the traveling range/area. The mobile sales robot 10 may perform circulate traveling (circuit travel) involving traveling along a predetermined route and/or call (on-demand) traveling toward a call position as designated by a customer. The number of mobile sales robots 10 is not limited.

Figure 2:
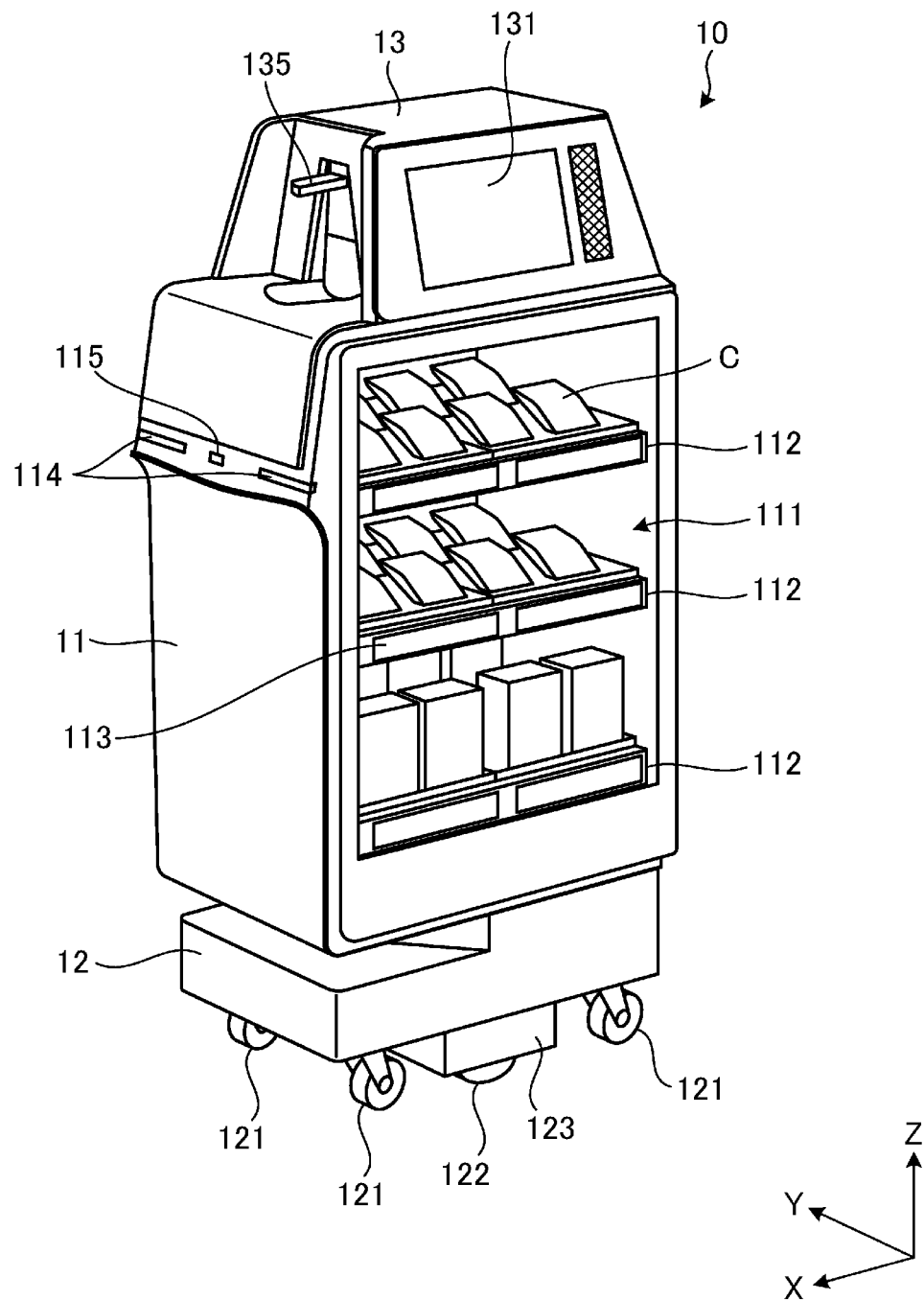
FIGS. 2 to 4 are a perspective views illustrating aspects of an external configuration of a mobile sales device according to an embodiment.
Figure 3:
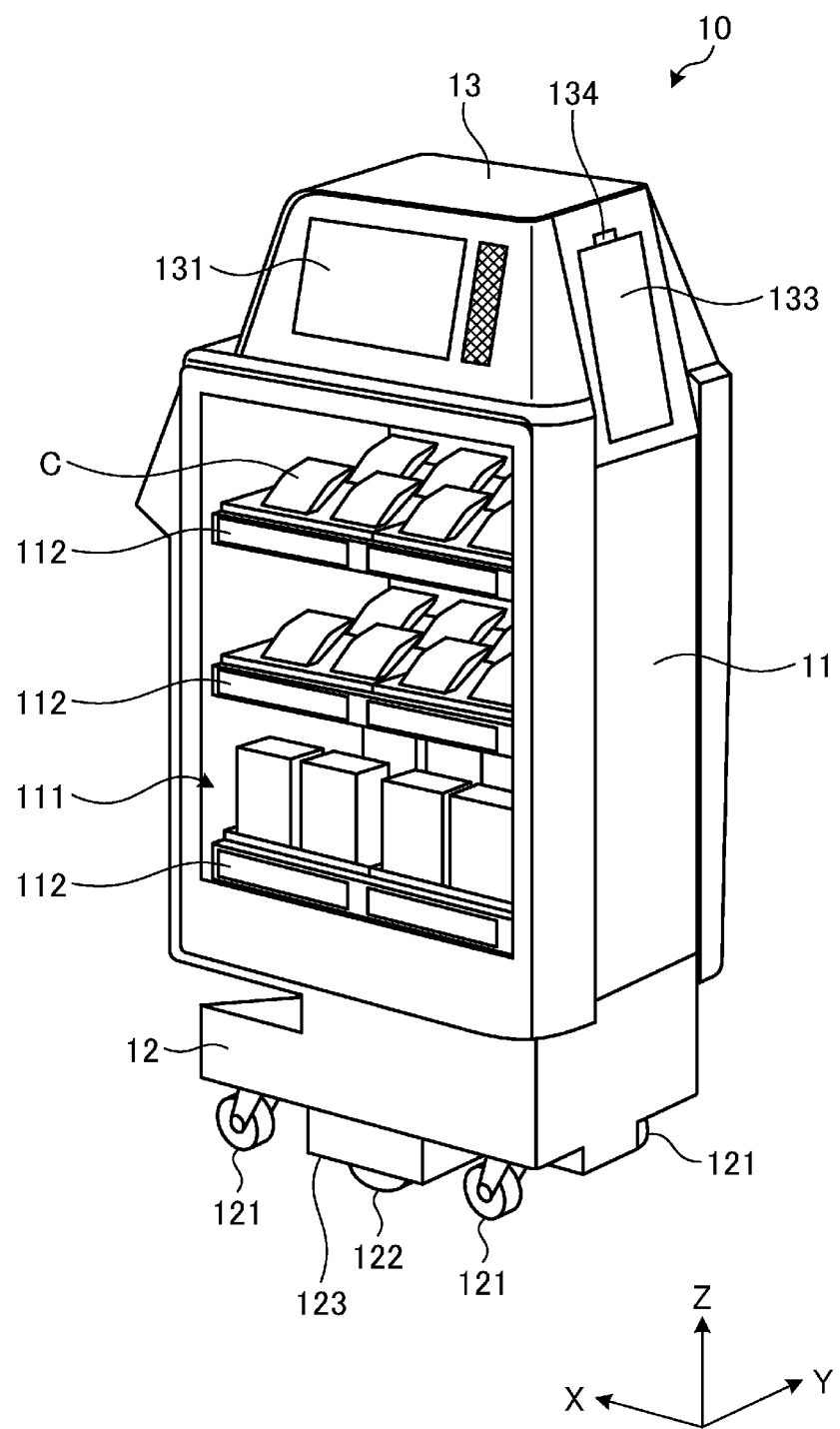
Figure 4:
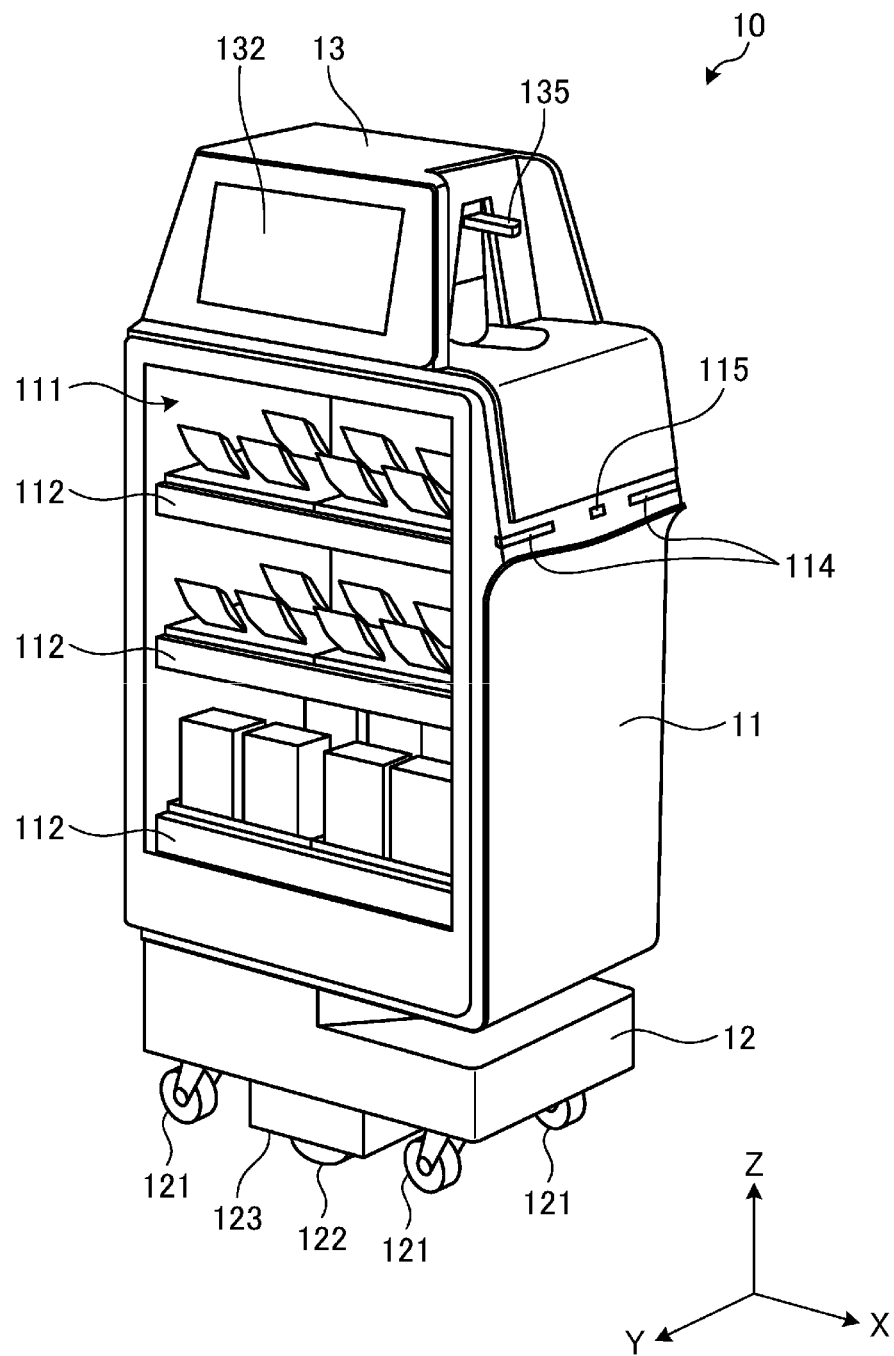

Here, an external configuration of the mobile sales robot 10 will be described with reference to FIGS. 2 to 4. FIGS. 2 to 4 are perspective views illustrating an example of the external configuration of the mobile sales robot 10.

In FIGS. 2 to 4, the configuration of the mobile sales robot 10 will be described using an X axis, a Y axis, and a Z axis that are orthogonal to one another. Hereinafter, the left side (a Y-axis negative direction side) of the mobile sales robot 10 is also referred to as a front surface side of the mobile sales robot 10. The right side (a Y-axis positive direction side) of the mobile sales robot 10 is also referred to as a back surface side of the mobile sales robot 10.

The mobile sales robot 10 includes a main body unit 11, a moving unit 12, and a user interface unit 13. The main body unit 11 is formed of a box-shaped housing whose front surface and back surface sides are open. An accommodation portion 111 is provided inside the main body unit 11.

The accommodation portion 111 is a space for accommodating items of merchandise C ("merchandises C") to be sold, such as food, and is an example of a mounting portion. In the accommodation portion 111, shelves 112 capable of displaying the merchandises C are arranged in multiple stages in the upper-lower direction while extending in the front-rear direction of the mobile sales robot 10. The merchandises C are placed on the shelves 112 by a store clerk or the like who manages the mobile sales robot 10. The merchandises C accommodated in the accommodation portion 111 are not limited to food and may be items of another type (category) such as medicine or leisure goods. The accommodation portion 111 may accommodate the merchandises C of a plurality of types.

For example, the shelves 112 may be divided into a plurality of regions in order to classify and place the merchandises C of the same type in the same regions. In this case, the shelves 112 may be divided into a plurality of regions using, for example, a tray.

A shelf label 113 for displaying a name and price of the merchandise C is provided on a front surface side of the shelf 112. The shelf label 113 may be a so-called electronic shelf label or digital signage that digitally displays information. Each shelf 112 is provided with a weight detection unit 159 (see FIG. 5) capable of detecting a weight of the merchandise C placed on the shelf 112. The weight detection unit 159 detects that an item placed on the shelf 112 has been removed from the shelf 112 by detecting a weight change. The weight detection unit 159 may also similarly detect when a previously removed item is returned to the shelf 112.

The shelf label 113 is provided on the front surface side of the shelf 112 in the present embodiment. The shelf label 113 may be provided on a back surface side of the shelf 112. In the present embodiment, both the front surface side and the back surface side of the main body unit 11 (the accommodation portion 111) are open, but in other examples just one side (for example, the front surface side) may be open.

A door formed of a light transmissive member such as glass may be attached to one or both of the front surface side and/or the back surface side of the main body unit 11 (the accommodation portion 111). The inside of the accommodation portion 111 may be accessible via the door. For example, the door may be attached to the front surface side of the main body unit 11. The back surface side of the main body unit 11 may be covered with a wall surface. In this case, the wall surface on the back surface side may be formed using a light transmissive member such as glass. Accordingly, it is possible to prevent the merchandise in the accommodation portion 111 from falling out of the accommodation portion 111 during movement of the mobile sales robot 10 or the like.

Further, the door may be lockable by providing an electronic lock or the like. Accordingly, for example, it is possible to prevent the merchandise in the accommodation portion 111 from being illegally taken out during the movement of the mobile sales robot 10 or the like.

A light emitting unit 114 and a distance measurement sensor 115 are provided on a front side of the main body unit 11. The light emitting unit 114 includes a light emitting element such as a light emitting diode (LED), and notifies an operation state of the mobile sales robot 10 by emitting light under the control of a control unit 154. For example, the light emitting unit 114 emits light to notify people that the mobile sales robot 10 is moving.

A light emission color of the light emitting unit 114 is not limited to a single color. For example, the light emitting unit 114 may change the light emission color or a light emission pattern according to the operation state of the mobile sales robot 10. The light emitting unit 114 may be provided not only on the front side of the main body unit 11 but also on a rear side thereof.

The distance measurement sensor 115 is a sensor device that detects an object around the mobile sales robot 10 and that detects a distance to the object. A sensing result of the distance measurement sensor 115 is output to the control unit 154 and used for collision avoidance during movement, detection of a user, and the like. The distance measurement sensor 115 can be implemented by, for example, a sensor device that detects an object or that measures a distance using a captured image or an ultrasonic wave, or a sensor device such as light detection and ranging (LiDAR) that detects an object using laser light.

A position where the distance measurement sensor 115 is provided is not limited to the front of the mobile sales robot 10. For example, the distance measurement sensor 115 may be provided at another position such as the rear of the mobile sales robot 10. An imaging unit 134 may be used as the distance measurement sensor 115.

The moving unit 12 is provided below the main body unit 11 and movably supports the main body unit 11. Specifically, the moving unit 12 includes non-driving wheels 121, a driving wheel 122, and a drive unit 123 that drives the driving wheel 122.

The non-driving wheel 121 is a small wheel. The non-driving wheel 121 freely changes a direction thereof according to a direction of a force generated by rotation of the driving wheel 122, thereby changing a traveling direction of the mobile sales robot 10 (the moving unit 12).

The driving wheel 122 is rotationally driven by the drive unit 123 to move the mobile sales robot 10 (the moving unit 12) forward or backward, or to rotate.

The user interface unit 13 is provided in an upper portion of the main body unit 11. The user interface unit 13 includes a first display unit 131, a second display unit 132, a third display unit 133, the imaging unit 134, a disinfection device 135, and the like.

The first display unit 131 is a display device provided on the front surface side of the mobile sales robot 10. The second display unit 132 is a display device provided on the back surface side of the mobile sales robot 10. The third display unit 133 is a display device provided on the rear side of the mobile sales robot 10. The first display unit 131, the second display unit 132, and the third display unit 133 display various types of information related to sales of the merchandise C or the like under the control of the control unit 154.

The imaging unit 134 is provided on the rear side of the mobile sales robot 10. The imaging unit 134 is a digital camera including an imaging element such as a charge coupled device (CCD) or a complementary MOS (CMOS). The imaging unit 134 captures an image of the user who uses the mobile sales robot 10 to acquire a face image of the user and the like.

The disinfection device 135 is a device permitting the user of the mobile sales robot 10 to perform a disinfection. In the present disclosure, disinfection refers to killing, removing, or otherwise rendering harmless pathogenic bacteria, viruses, and other microorganisms present on or in an object. The disinfection can be read as degerming, sterilization, or pasteurization.

A device configuration of the disinfection device 135 is not particularly limited. For example, the disinfection device 135 may be a sprayer that sprays a disinfectant such as alcohol. The disinfection device 135 may be an ultraviolet disinfection device that emits ultraviolet light. The disinfection device 135 performs a disinfection operation such as spraying the disinfectant or emitting the ultraviolet light according to a user operation.

An operation state of the disinfection device 135 may be electrically output to the control unit 154. In this case, for example, the user interface unit 13 or the disinfection device 135 includes a sensor device (also referred to as a disinfection operation detection unit) that detects the disinfection operation of the disinfection device 135. When the disinfection operation detection unit detects that the disinfection device 135 performs the disinfection operation, the disinfection operation detection unit outputs a detection signal to the control unit 154.

The configuration of the user interface unit 13 is not limited to the illustrated example. For example, the number and arrangement positions of display devices provided in the user interface unit 13 are not limited to the illustrated example. The user interface unit 13 need not include the disinfection device 135. The user interface unit 13 may include a reader device that reads information stored in a code symbol such as a two-dimensional code, a reader device that reads information from a card medium such as an IC card or a credit card, or the like.

Referring back to FIG. 1, the user terminal 20 is a device used by a user of the mobile sales system 1 and is an example of a terminal device. The user terminal 20 is implemented as a portable terminal device such as a smartphone or a tablet terminal. The user terminal 20 receives, from the user, a call request for requesting to call the mobile sales robot 10, and transmits the received call request to the server device 30. The number of user terminals 20 is not limited to the example in FIG. 1.

The server device 30 manages the mobile sales system 1. The server device 30 is implemented by, for example, an information processing device such as a personal computer (PC). The server device 30 tracks items sold by each mobile sales robot 10. The server device 30 manages the mobile sales robot 10 and causes the mobile sales robot 10 to travel to the call position designated by a call request received from a user terminal 20. For example, the server device 30 tracks current positions of the mobile sales robots 10 and the user terminals 20. When receiving the call request for a mobile sales robot 10 from a user terminal 20, the server device 30 causes the mobile sales robot 10 designated by the call request to travel toward the position of the user terminal 20.

A hardware configuration and functional aspects of each device provided in the mobile sales system 1 will be described.

Figure 5:
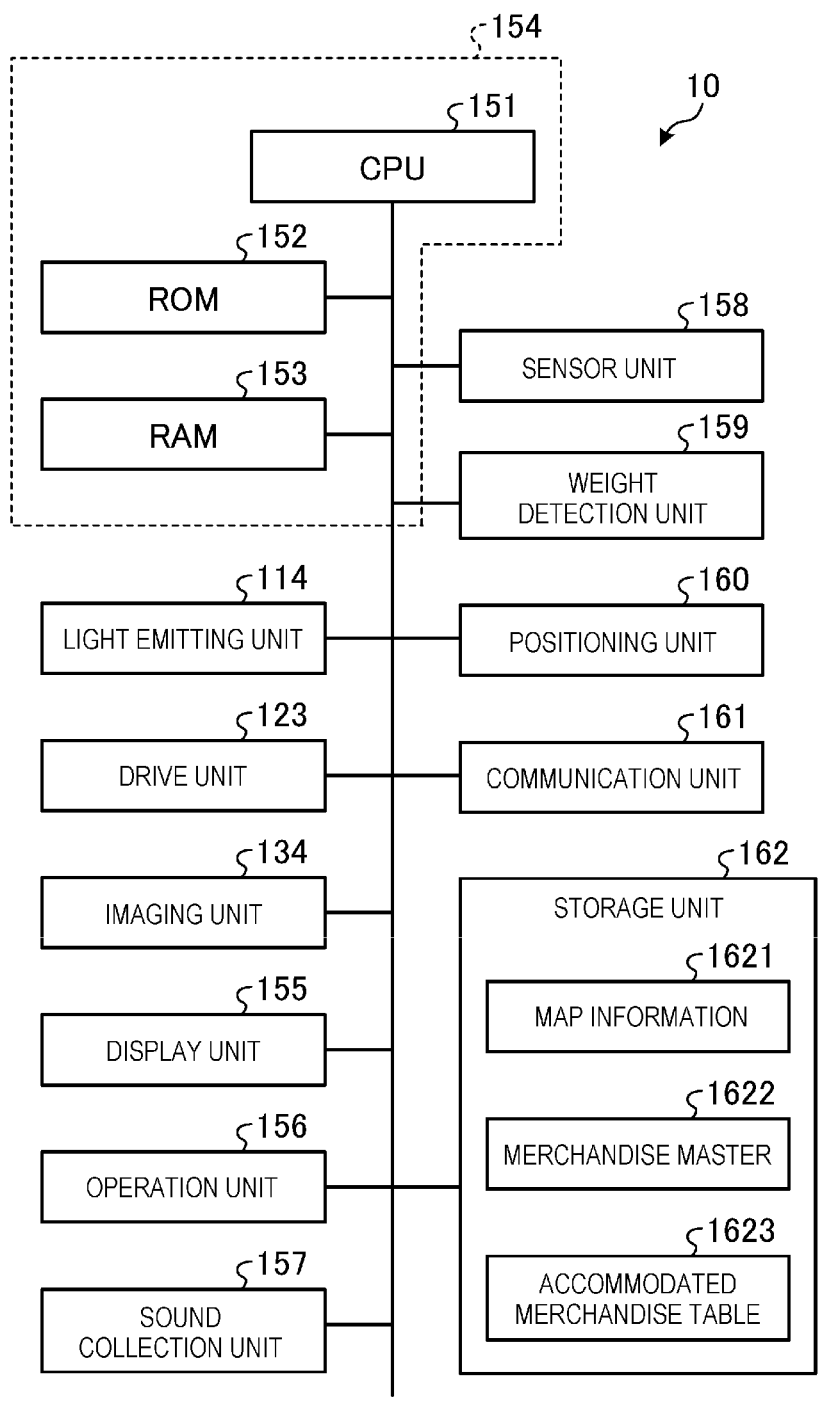
FIG. 5 is a diagram illustrating an example of a hardware configuration of a mobile sales device according to an embodiment.

First, a hardware configuration of the mobile sales robot 10 will be described. FIG. 5 is a diagram illustrating an example of a hardware configuration of the mobile sales robot 10. As illustrated in FIG. 5, the mobile sales robot 10 includes a central processing unit (CPU) 151, a read only memory (ROM) 152, and a random access memory (RAM) 153.

The CPU 151 is an example of a processor, and integrally controls each unit of the mobile sales robot 10. The ROM 152 stores various programs. The RAM 153 is a work space in which programs and various types of data are loaded.

The CPU 151, the ROM 152, and the RAM 153 are connected via a bus or the like, and constitute the control unit 154. In the control unit 154, the CPU 151 operates according to a program stored in a storage unit 162 and loaded in the RAM 153, thereby executing various processes.

The mobile sales robot 10 includes the light emitting unit 114, the drive unit 123, and the imaging unit 134 described above. The mobile sales robot 10 includes a display unit 155, an operation unit 156, a sound collection unit 157, a sensor unit 158, the weight detection unit 159, a positioning unit 160, a communication unit 161, the storage unit 162, and the like.

The display unit 155 is a display device such as the first display unit 131, the second display unit 132, and the third display unit 133 described above. The display unit 155 can be a liquid crystal display (LCD) or the like. The display unit 155 displays various types of information under the control of the CPU 151. When the shelf label 113 is an electronic shelf label, the display unit 155 includes the electronic shelf label.

The operation unit 156 is an input device such as a keyboard or a pointing device. The operation unit 156 outputs an operation content received from the user to the CPU 151. The operation unit 156 may be a touch panel provided on the display screen of the display unit 155.

The sound collection unit 157 collects a sound around the mobile sales robot 10 and outputs a sound signal of the collected sound to the CPU 151. The sound collection unit 157 is implemented by, for example, a sound collection device such as a microphone. The sound collection unit 157 collects, for example, a sound for stopping the traveling of the mobile sales robot 10 from a user who wishes to purchase the merchandise during the circulate traveling of the mobile sales robot 10.

The sensor unit 158 is a sensor device such as the distance measurement sensor 115 and the disinfection operation detection unit described above. The sensor unit 158 outputs a detection result obtained by sensing to the CPU 151.

The weight detection unit 159 is a weight sensor that detects a weight of the merchandise accommodated in the accommodation portion 111. Specifically, the weight detection unit 159 is provided in each of the shelves 112, and detects the weight or a weight change of the merchandise placed on the shelf 112.

Here, each of the shelves 112 and the weight detection unit 159 provided in the shelf 112 are associated with each other in advance. When the weight change is detected by the weight detection unit 159, the shelf 112 having the weight change can be identified.

When the shelf 112 is divided into a plurality of regions, the weight detection unit 159 may be provided for each of the divided regions. In this case, each of the divided regions and the weight detection unit 159 provided in the region are associated with each other.

The positioning unit 160 measures a position where the mobile sales robot 10 is present. The positioning unit 160 can be implemented by a positioning device using a positioning technique such as a global positioning system (GPS).

The positioning unit 160 may be implemented by a position measurement device using a positioning technique such as beacon positioning or radio frequency identifier (RFID) positioning. In this case, by providing a terminal corresponding to the positioning technique such as the beacon positioning or the RFID positioning at each position in a range in which the mobile sales robot 10 is movable, the position where the mobile sales robot 10 is present can be measured (identified) by a positioning system formed by the terminal and the positioning unit 160.

The communication unit 161 is a wireless communication interface connectable to the network N. The communication unit 161 communicates with an external device such as the server device 30 via the network N.

The storage unit 162 includes a storage medium such as a hard disk drive (HDD) or a flash memory, and maintains a stored content even when a power supply is cut off. The storage unit 162 stores programs that can be executed by the CPU 151 and various types of setting information.

The storage unit 162 stores map information 1621, a merchandise master 1622, and an accommodated merchandise table 1623. Here, the map information 1621 is information indicating a map having the range in which the mobile sales robot 10 moves.

The merchandise master 1622 is a data table storing information related to a merchandise to be sold. FIG. 6 is a diagram illustrating an example of a data configuration of the merchandise master 1622. As illustrated in FIG. 6, the merchandise master 1622 stores, in association with a merchandise code for identifying a merchandise, merchandise information on the merchandise corresponding to the merchandise code. The merchandise information includes a merchandise name, a type, a price, a weight, image data, and the like.

The data configuration of the merchandise master 1622 is not limited to the example in FIG. 6. For example, the merchandise master 1622 may store image data representing a feature of the merchandise in the merchandise information.

The storage unit 162 may not store the merchandise master 1622. In this case, the mobile sales robot 10 refers to a merchandise master 3162 stored in the server device 30. Therefore, the mobile sales robot 10 can handle the merchandise master 3162 similarly to the configuration of storing the merchandise master 1622.

The accommodated merchandise table 1623 is a data table for storing information related to items accommodated in the accommodation portion 111. FIG. 7 is a diagram illustrating an example of a data configuration of the accommodated merchandise table 1623. As illustrated in FIG. 7, the accommodated merchandise table 1623 stores, in association with a shelf ID capable of identifying each of the shelves 112 provided in the accommodation portion 111, a merchandise code of the merchandise placed on the shelf 112 having the shelf ID and the quantity of the placed items.

The data configuration of the accommodated merchandise table 1623 is not limited to the example in FIG. 7. For example, when the shelf 112 is divided into a plurality of regions, the accommodated merchandise table 1623 may assign an identifier to each of the divided regions, and store the merchandise code of the merchandise placed in the region and the quantity in association with each other.

Figure 8:
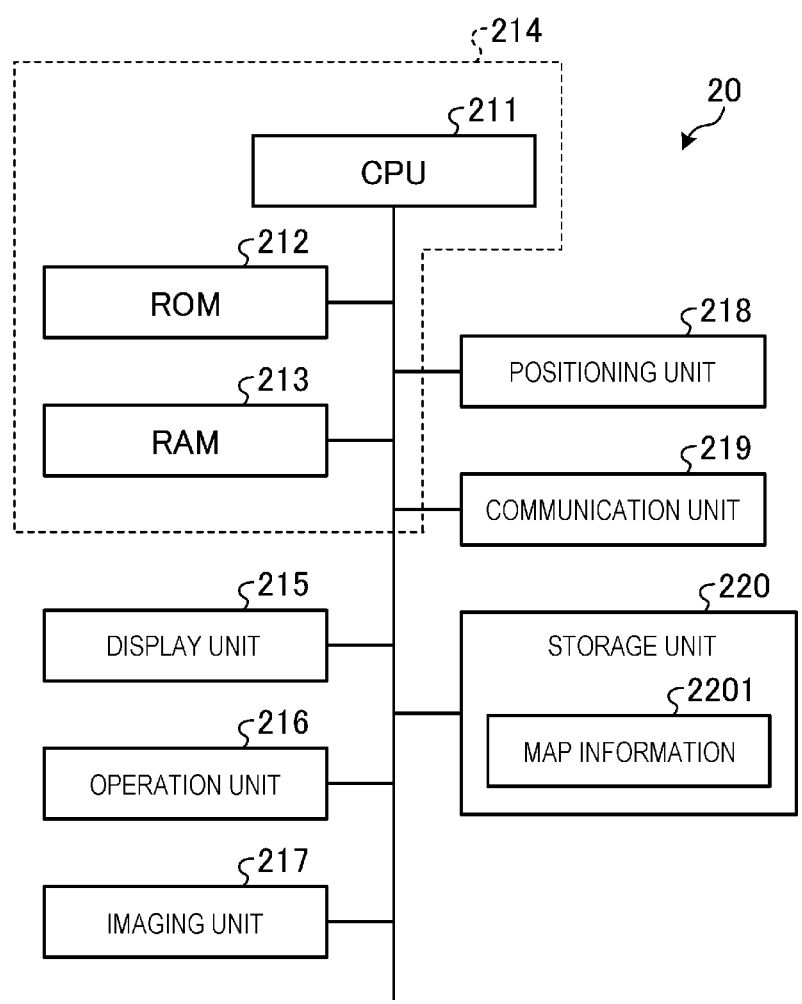
FIG. 8 is a diagram illustrating an example of a hardware configuration of a user terminal.

Next, a hardware configuration of the user terminal 20 will be described. FIG. 8 is a diagram illustrating an example of the hardware configuration of the user terminal 20. As illustrated in FIG. 8, the user terminal 20 includes a CPU 211, a ROM 212, and a RAM 213.

The CPU 211 is an example of a processor, and integrally controls each unit of the user terminal 20. The ROM 212 stores various programs. The RAM 213 is a work space in which programs and various types of data are loaded.

The CPU 211, the ROM 212, and the RAM 213 are connected via a bus or the like, and constitute a control unit 214. In the control unit 214, the CPU 211 operates according to a control program stored in the storage unit 220 and loaded in the RAM 213, thereby executing various processes.

The user terminal 20 includes a display unit 215, an operation unit 216, an imaging unit 217, a positioning unit 218, a communication unit 219, a storage unit 220, and the like.

The display unit 215 is a display device such as an LCD screen or the like. The display unit 215 displays various types of information under the control of the CPU 211. The operation unit 216 is an input device such as a keyboard or a pointing device. The operation unit 216 outputs an operation content received from the user to the CPU 211. The operation unit 216 may be a touch panel provided on a display screen of the display unit 215.

The imaging unit 217 can be a digital camera including an imaging element such as a CCD or a CMOS. The imaging unit 217 captures an image of the user of the user terminal 20 to acquire a face image of the user.

The positioning unit 218 measures a position where the user terminal 20 is present. The positioning unit 218 can be implemented by, for example, a positioning device using a positioning technique such as GPS. The positioning unit 218 may be implemented by a position measurement device using a positioning technique such as beacon positioning or RFID positioning, similarly to the above-described positioning unit 160.

The communication unit 219 is a wireless communication interface connectable to the network N. The communication unit 219 communicates with an external device such as the server device 30 via the network N.

The storage unit 220 includes a storage medium such as an HDD or a flash memory, and maintains a stored content even when the power supply is cut off. The storage unit 220 stores programs that can be executed by the CPU 211 (including application programs related to processes of the mobile sales system 1) and various types of setting information.

The storage unit 220 stores map information 2201 and the like. Here, similarly to the map information 1621, the map information 2201 is information indicating a map having the range in which the mobile sales robot 10 moves.

Figure 9:
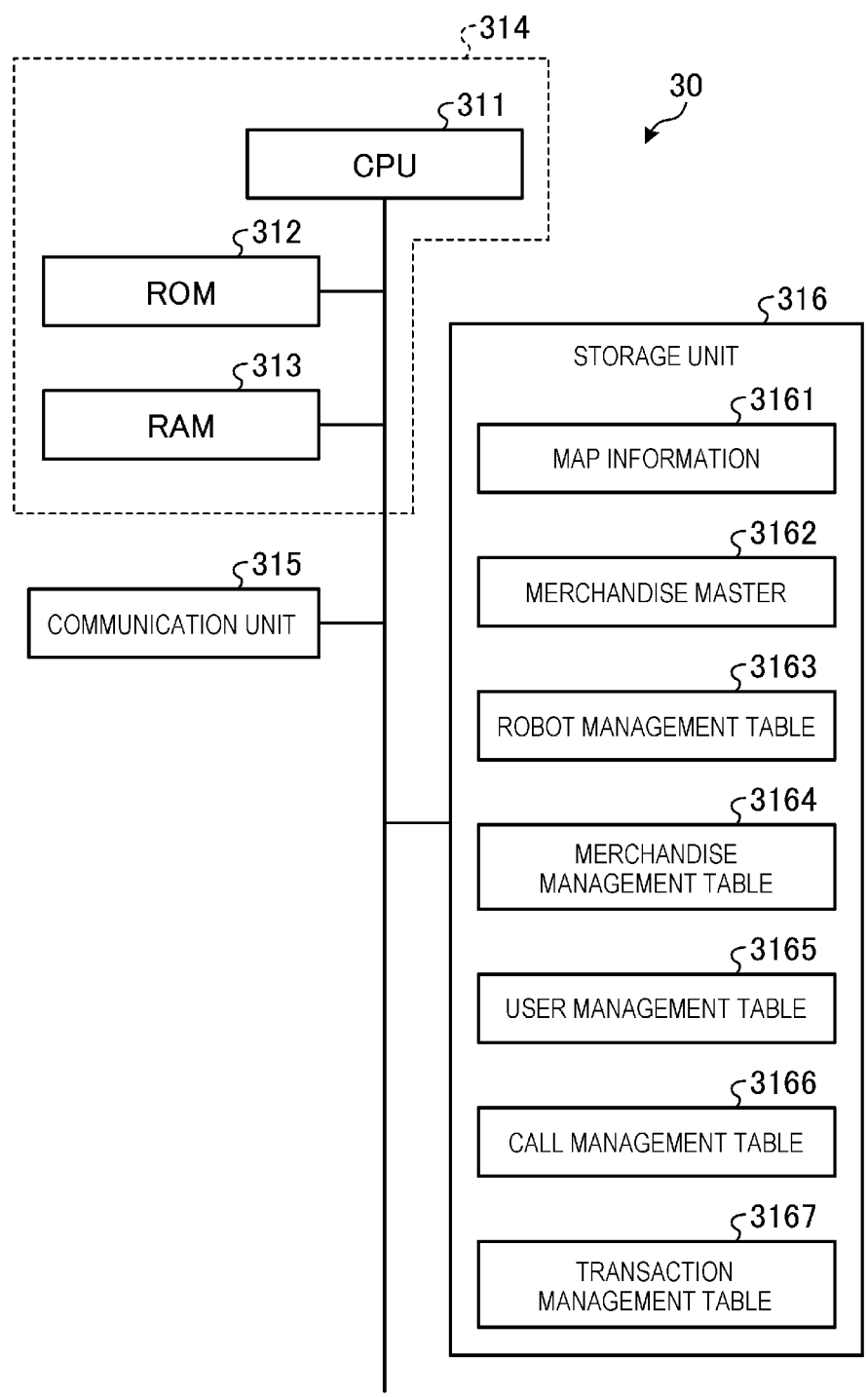
FIG. 9 is a diagram illustrating an example of a hardware configuration of a server device.

Next, a hardware configuration of the server device 30 will be described. FIG. 9 is a diagram illustrating an example of the hardware configuration of the server device 30. As illustrated in FIG. 9, the server device 30 includes a CPU 311, a ROM 312, and a RAM 313.

The CPU 311 is an example of a processor, and integrally controls units of the server device 30. The ROM 312 stores various programs. The RAM 313 is a work space in which programs and various types of data are loaded.

The CPU 311, the ROM 312, and the RAM 313 are connected via a bus or the like, and constitute a control unit 314. In the control unit 314, the CPU 311 operates according to a control program stored in the storage unit 316 and loaded in the RAM 313, thereby executing various processes.

The server device 30 includes a communication unit 315, a storage unit 316, and the like. The communication unit 315 is a wired or wireless communication interface connectable to the network N. The communication unit 315 communicates with external devices such as the mobile sales robot 10 and the user terminal 20 via the network N.

The storage unit 316 includes a storage medium such as an HDD or a flash memory, and maintains a stored content even when the power supply is cut off. The storage unit 316 stores programs that can be executed by the CPU 311 and various types of setting information.

The storage unit 316 stores map information 3161 and the merchandise master 3162. The map information 3161 is information indicating a map having the range in which the mobile sales robot 10 moves. The merchandise master 3162 is a data table storing information related to a merchandise to be sold. The data configuration of the merchandise master 3162 is similar to that of the merchandise master 1622 described above.

The storage unit 316 stores a robot management table 3163, a merchandise management table 3164, a user management table 3165, a call management table 3166, a transaction management table 3167, and the like.

The robot management table 3163 is a data table for managing a position and a state of the mobile sales robot 10. FIG. 10 is a diagram illustrating an example of a data configuration of the robot management table 3163. As illustrated in FIG. 10, the robot management table 3163 stores, in association with a robot ID, position information indicating a current position of the mobile sales robot 10 corresponding to the robot ID and state information indicating the state of the mobile sales robot 10. The robot ID is used for identifying the mobile sales robot 10, and is an example of mobile sales device identifying information.

Here, the position information may be indicated by coordinate values such as longitude and latitude. The position information may be indicated by a block number, grid number, or the like obtained by dividing a movable range of the mobile sales robot 10 into a plurality of blocks.

Examples of the possible states of the mobile sales robot 10 include a state of "moving" in which the mobile sales robot 10 moves to a call position designated by the user, a state of "waiting for transaction" in which the mobile sales robot 10 arrives at the call position and waits for an operation of starting a transaction, and a state of "transaction" in which a transaction has been started by user operation. Other examples of the possible state of the mobile sales robot 10 include a state of "waiting for call" (capable of responding to a call from a user), such as a time when the mobile sales robot 10 circulates, and a state of "unsellable" in which the mobile sales robot 10 cannot sell merchandise due to the need for merchandise replenishment or the like.

The information stored in the robot management table 3163 is updated according to the movement of the mobile sales robot 10 and the state of the mobile sales robot 10 under the control of an information management unit 3142.

The merchandise management table 3164 is a data table for managing items sold by each mobile sales robot 10. FIG. 11 is a diagram illustrating an example of a data configuration of the merchandise management table 3164. As illustrated in FIG. 11, the merchandise management table 3164 stores, in association with the robot ID, the merchandise code of the merchandise sold by the mobile sales robot 10 having the robot ID and a stock quantity of the items.

The information stored in the merchandise management table 3164 is updated according to the stock quantity of the items stored by the mobile sales robot 10 under the control of the information management unit 3142.

The user management table 3165 is a data table for managing users who use the mobile sales system 1. FIG. 12 is a diagram illustrating an example of a data configuration of the user management table 3165. As illustrated in FIG. 12, the user management table 3165 stores, in association with a user ID capable of identifying each user, user information related to the user having the user ID.

The user information includes feature information indicating features of a face of the user and settlement information used for electronic settlement. The feature information is, for example, a face image obtained by capturing an image of the face of the user, or feature data indicating the features of the face, and is used as collation data in a face authentication. The settlement information is information such as an account for using an electronic settlement service contracted in advance by the user. Here, the electronic settlement service includes code settlement, electronic money settlement, credit settlement, and the like. When the electronic settlement service is the credit settlement, the settlement information may be a number of a credit card owned by the user.

The user information is acquired from the user according to a standard member registration method and is registered in the user management table 3165. The user ID may be automatically assigned, or may be unique information input by the user. The user information may include other information. For example, the user information may include personal information such as a name, an age, and an address of the user. The user information may include a terminal ID of a terminal (the user terminal 20) used by the user, a communication address of the terminal, and the like.

The call management table 3166 is a data table for managing calls of the mobile sales robot 10 by the user terminal 20. FIG. 13 is a diagram illustrating an example of a data configuration of the call management table 3166. As illustrated in FIG. 13, the call management table 3166 stores a terminal ID of the user terminal 20 that makes the call, a date and time (a call date and time) when the call is received, position information (also simply referred to as a "call position") indicating the call position, authentication information used for authentication for the user who called, a robot ID of the mobile sales robot 10 corresponding to the call, a date and time (an arrival date and time) when the mobile sales robot 10 arrived at the call position, and the like in association with one another.

As the authentication information, for example, a pin code of a predetermined number of digits, a face image of a user, and/or a user ID can be used. In the former case, the pin code may be issued by the control unit 314 or may be designated by the user. In the latter case, the face image or the user ID transmitted from the user terminal 20 of the user who called, the user ID identified by the control unit 314 from the user management table 3165 based on the transmitted face image, or the like can be used. In the present embodiment, a configuration in which the control unit 314 issues the pin code when receiving the call will be described.

The transaction management table 3167 is a data table for managing transactions via the mobile sales robot 10. FIG. 14 is a diagram illustrating an example of a data configuration of the transaction management table 3167. As illustrated in FIG. 14, the transaction management table 3167 stores, in association with a transaction ID for identifying a transaction, a robot ID of the mobile sales robot 10 with which the transaction is performed, a user ID of the user who performs the transaction, a merchandise code of the merchandise purchased by the user, a settlement flag for determining whether the settlement is completed, and the like.

Figure 15:
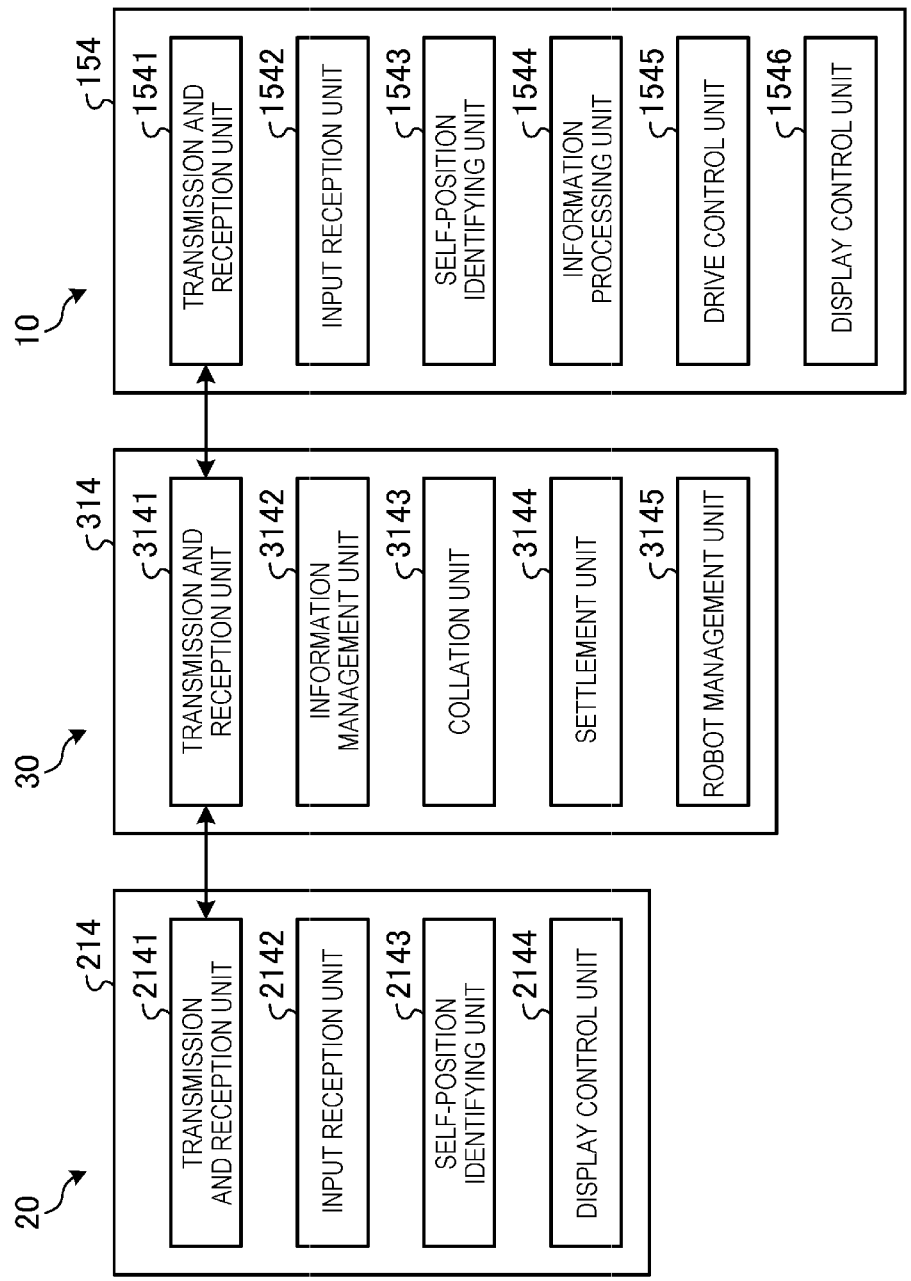
FIG. 15 is a block diagram illustrating functional aspects of devices in a mobile sales system.

Next, a functional configuration of each device constituting the mobile sales system 1 will be described. FIG. 15 is a block diagram illustrating the functional configuration of devices constituting the mobile sales system 1. First, the user terminal 20 will be described.

The control unit 214 of the user terminal 20 functions as a transmission and reception unit 2141, an input reception unit 2142, a self-position identifying unit 2143, and a display control unit 2144 when the CPU 211 operates according to a control program stored in the ROM 212 or the storage unit 220. The functions may be implemented by hardware such as a dedicated circuit.

The transmission and reception unit 2141 transmits and receives various types of information to and from an external device such as the server device 30 via the communication unit 219. A function and operation of the transmission and reception unit 2141 to "receive" information from the server device 30 or the like can also be rephrased as "acquiring" information.

For example, the transmission and reception unit 2141 receives, from the server device 30, each piece of information related to the robot ID, the current position, and the state of the mobile sales robot 10. The transmission and reception unit 2141 transmits a merchandise information request or a call request to the server device 30. The merchandise information request designates the mobile sales robot 10 and requests information on the merchandise accommodated in the mobile sales robot 10, that is, the merchandise to be sold. The merchandise information request includes information such as a terminal ID of the user terminal 20 which is a request source, and a robot ID of the mobile sales robot 10 to be designated.

The call request designates the mobile sales robot 10 and requests a call of the mobile sales robot 10. The call request includes information such as the terminal ID of the user terminal 20 which is the request source, the robot ID of the mobile sales robot 10 to be designated, and the call position. In a configuration in which the user designates authentication information, the call request further includes the designated authentication information. In the present embodiment, the call position is a position where the user terminal 20 is present, that is, a position measured by the positioning unit 218. The call position desired by the user may be designated by the user terminal 20.

The transmission and reception unit 2141 receives the merchandise information transmitted by the server device 30 according to the merchandise information request. Furthermore, the transmission and reception unit 2141 receives a pin code issued by the server device 30 in association with the call request. The pin code is for authenticating the user who called the mobile sales robot 10 is the user who now intends to start shopping at the mobile sales robot 10.

The transmission and reception unit 2141 receives an arrival notification or a settlement completion notification from the server device 30. The arrival notification indicates that the mobile sales robot 10 arrives at the call position designated by the call request. The settlement completion notification indicates that the settlement related to the purchase of the merchandise accommodated in the mobile sales robot 10 is completed.

The input reception unit 2142 receives input information based on an operation of the operation unit 216. For example, the input reception unit 2142 receives the merchandise information request or the call request from the operation unit 216.

The self-position identifying unit 2143 identifies the position of the user terminal 20 in an area represented by the map information 2201 based on an output of the positioning unit 218.

The display control unit 2144 causes the display unit 215 to display various types of information. Specifically, the display control unit 2144 causes the display unit 215 to display various screens (a graphic user interface (GUI)) for supporting purchase of the merchandise sold by the mobile sales robot 10. For example, the display control unit 2144 causes the display unit 215 to display a display screen for supporting the call of the mobile sales robot 10.

Figure 16:
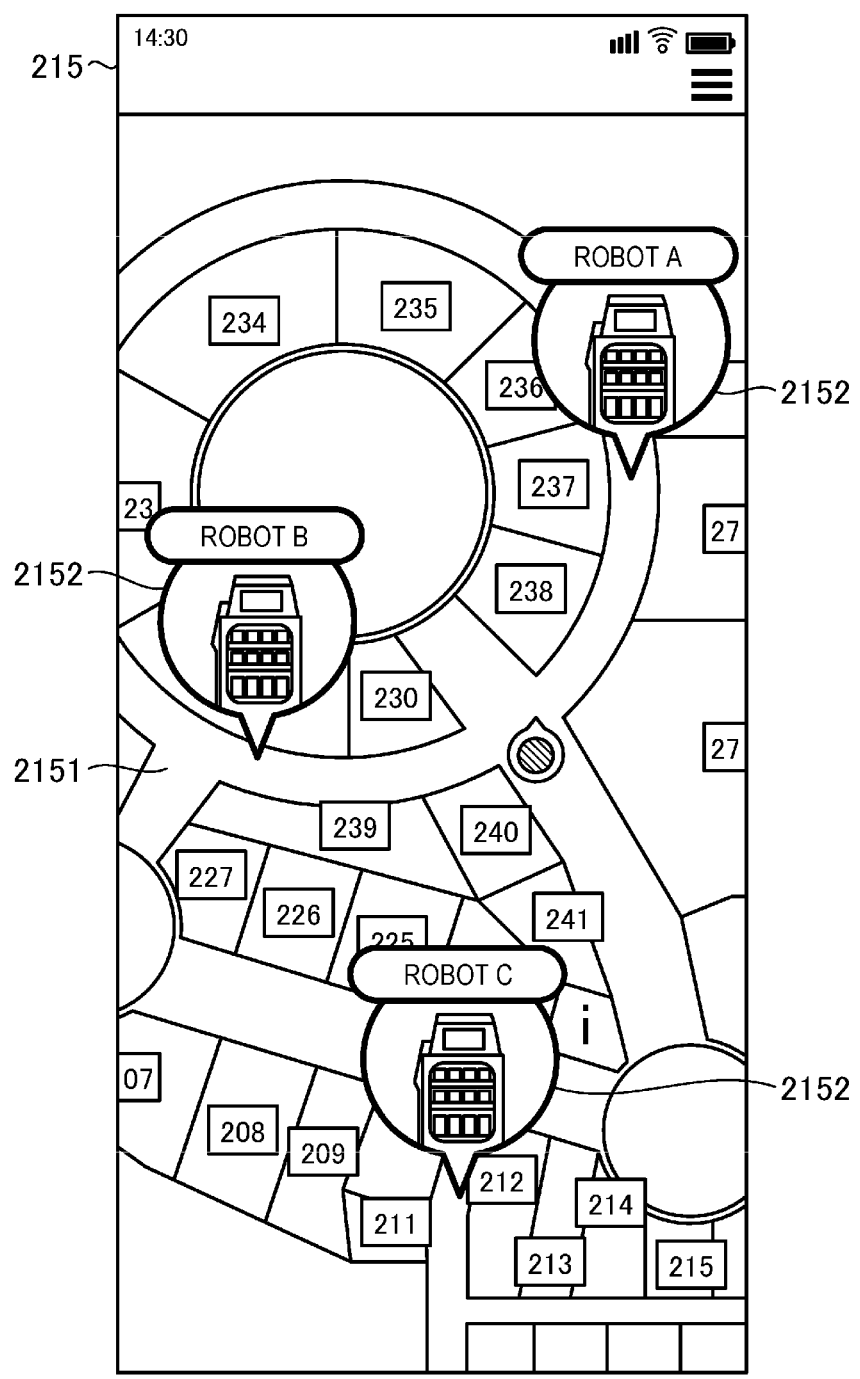
FIG. 16 is a diagram illustrating an example of a first display screen displayed on a display unit of a user terminal.
Figure 17:
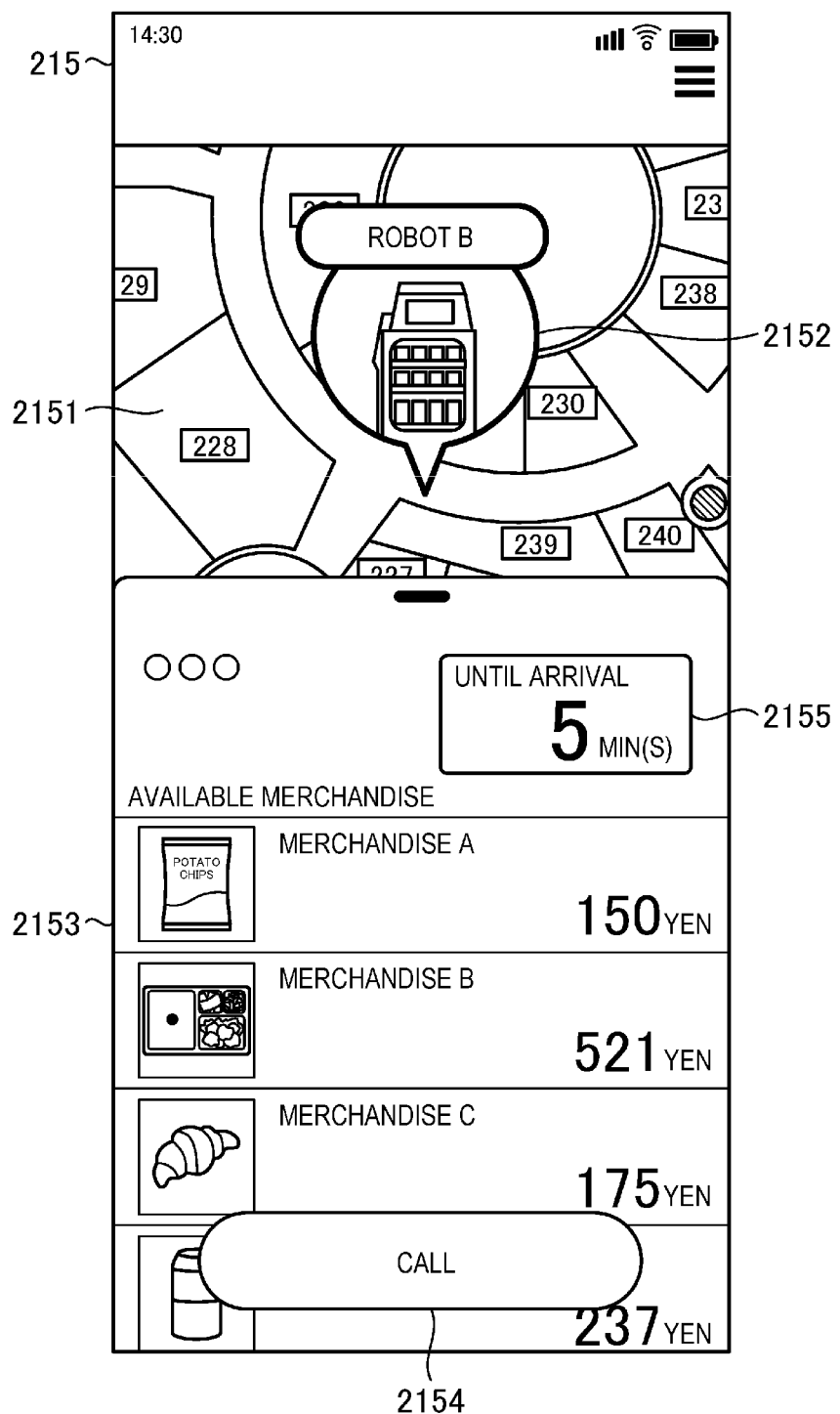
FIG. 17 is a diagram illustrating an example of a second display screen.

An example of a display screen displayed by the display control unit 2144 will be described with reference to FIGS. 16 and 17. FIG. 16 is a diagram illustrating an example of a first display screen displayed on the display unit 215 of the user terminal 20. FIG. 17 is a diagram illustrating an example of a second display screen displayed on the display unit 215 of the user terminal 20.

The display control unit 2144 displays the mobile sales robots 10 in a selectable manner on the map in response to positions where the mobile sales robots 10 are present, and then displays the merchandise information of the items mounted on the selected mobile sales robots 10 together with a call button. Specifically, when a merchandise information request menu is selected from a menu selection screen or the like, the display control unit 2144 displays the first display screen illustrated in FIG. 16 on the display unit 215.

The first display screen includes a map display region 2151. The display control unit 2144 displays, based on the map information 2201, a map having the range in which the mobile sales robot 10 is movable in the map display region 2151. Here, the display control unit 2144 may display a map of the vicinity of the position where the user terminal 20 is present based on the position information identified by the self-position identifying unit 2143, or may display a map of the vicinity of the position where the mobile sales robot 10 is present based on the position information of the mobile sales robot 10 provided from the server device 30. The display control unit 2144 changes the range of the map to be displayed in the map display region 2151 according to an operation (for example, a scroll operation, and an enlargement and reduction operation) on the map.

The display control unit 2144 displays robot marks 2152 representing the mobile sales robots 10 in a manner of being superimposed on the map of the map display region 2151. Specifically, the display control unit 2144 displays the robot marks 2152 at positions where the mobile sales robots 10 are present on the map. Robot identification information such as the robot ID is also displayed on the robot mark 2152.

The user can select the corresponding mobile sales robot 10 by touching any one of the robot marks 2152 displayed on the first display screen. When the input reception unit 2142 receives the designation of the mobile sales robot 10, the transmission and reception unit 2141 transmits the merchandise information request including the terminal ID of the user terminal 20 and the robot ID of the designated mobile sales robot 10 to the server device 30. The server device 30 that receives the merchandise information request reads the merchandise information on the merchandise sold by the mobile sales robot 10 having the designated robot ID from the merchandise management table 3164 and transmits the merchandise information to the user terminal 20.

When the transmission and reception unit 2141 receives the merchandise information, the display control unit 2144 displays the merchandise information in association with the robot mark 2152 of the selected mobile sales robot 10, as illustrated in the second display screen in FIG. 17. That is, the second display screen is a screen to be displayed when any one of the robot marks 2152 displayed on the first display screen is touched.

As illustrated in FIG. 17, the second display screen includes the map display region 2151 and a merchandise information display region 2153. Similarly to the map display region 2151 on the first display screen, the map display region 2151 is a region for displaying a map based on the map information 2201. The map display region 2151 is smaller than the map display region 2151 on the first display screen. The display control unit 2144 causes the robot mark 2152 touched on the first display screen and a map around the robot mark 2152 to be displayed in the map display region 2151.

The merchandise information display region 2153 is a region for displaying the merchandise information on the merchandise mounted on the selected mobile sales robot 10. The display control unit 2144 causes the merchandise information transmitted from the server device 30 according to the selection of the mobile sales robot 10 to be displayed in the merchandise information display region 2153. Specifically, the display control unit 2144 causes merchandise information to be displayed side by side in an upper-lower direction on a per merchandise item basis. The displayed merchandise information includes a merchandise image, a merchandise name, a price, and the like. The merchandise information display region 2153 can be scrolled in the upper-lower direction. The display control unit 2144 updates the merchandise information to be displayed according to a scroll operation. Accordingly, the merchandise information display region 2153 can display the merchandise information of all the items mounted on the mobile sales robot 10.

The second display screen includes a call button 2154 for calling the selected mobile sales robot 10. The user can check, on the second display screen, the items that is mounted on the mobile sales robot 10 selected on the first display screen, and can call the mobile sales robot 10 by touching the call button 2154 when there is a merchandise that the user desires to purchase. By calling the mobile sales robot 10 using the first display screen and the second display screen, the user can select the mobile sales robot 10 to be called while checking the position of the mobile sales robot 10. Therefore, for example, the mobile sales robot 10 can be efficiently called, such as calling the mobile sales robot 10 closest to the position of the user.

Specifically, when the input reception unit 2142 receives the operation of the call button 2154 on the second display screen, the transmission and reception unit 2141 transmits, to the server device 30, the call request including the terminal ID of the user terminal 20, the robot ID of the designated mobile sales robot 10, the position information (the call position) identified by the self-position identifying unit 2143, and the like. The server device 30 that receives the call request causes the designated mobile sales robot 10 (as corresponding to the designated robot ID) to travel to the designated call position. The server device 30 predicts, based on the current position and the call position of the designated robot ID, the number of call requests for the robot ID registered in the call management table 3166, and the like, a time until the mobile sales robot 10 corresponding to the robot ID arrives at the call position (also referred to as an arrival time), and transmits the predicted arrival time to the user terminal 20 which is the request source.

The second display screen includes an arrival time display region 2155 for displaying a time until the selected mobile sales robot 10 arrives at the position of the user terminal 20. The display control unit 2144 displays the arrival time transmitted from the server device 30 according to the selection of the mobile sales robot 10 in the arrival time display region 2155. In the arrival time display region 2155, the robot ID or the like of the mobile sales robot 10 scheduled to arrive may be displayed.

A timing of displaying the arrival time is not limited to a timing after the operation of the call button 2154. For example, the display control unit 2144 may display the arrival time at a timing when the mobile sales robot 10 is selected on the first display screen. In this case, the transmission and reception unit 2141 may include the position information identified by the self-position identifying unit 2143 in the merchandise information request and transmit the merchandise information request to the server device 30, thereby acquiring the arrival time from the server device 30 at the timing when the mobile sales robot 10 is selected.

The second display screen displays the mobile sales robot 10 selected on the first display screen in an identifiable manner. Specifically, in the map display region 2151, the robot mark 2152 to which the display of "robot B" is added is displayed together with the map around the robot mark 2152. The "robot B" is the information for identifying the mobile sales robot 10 selected on the first display screen. Accordingly, the user can check the position, the identification information, the merchandise information on the merchandise to be mounted, and the like of the selected mobile sales robot 10 on one screen. The information for identifying the mobile sales robot 10 may be a unique number, name, or the like set for each mobile sales robot 10.

A method for displaying the information for identifying the selected mobile sales robot 10 is not limited to the above. For example, the information for identifying the mobile sales robot 10 in association with the arrival time may be displayed in the arrival time display region 2155. The information for identifying the mobile sales robot 10 may be displayed in the merchandise information display region 2153.

The display screen related to the call of the mobile sales robot 10 is not limited to the examples in FIGS. 16 and 17. Additional display screens will be described with reference to FIGS. 18 and 19.

Figure 18:
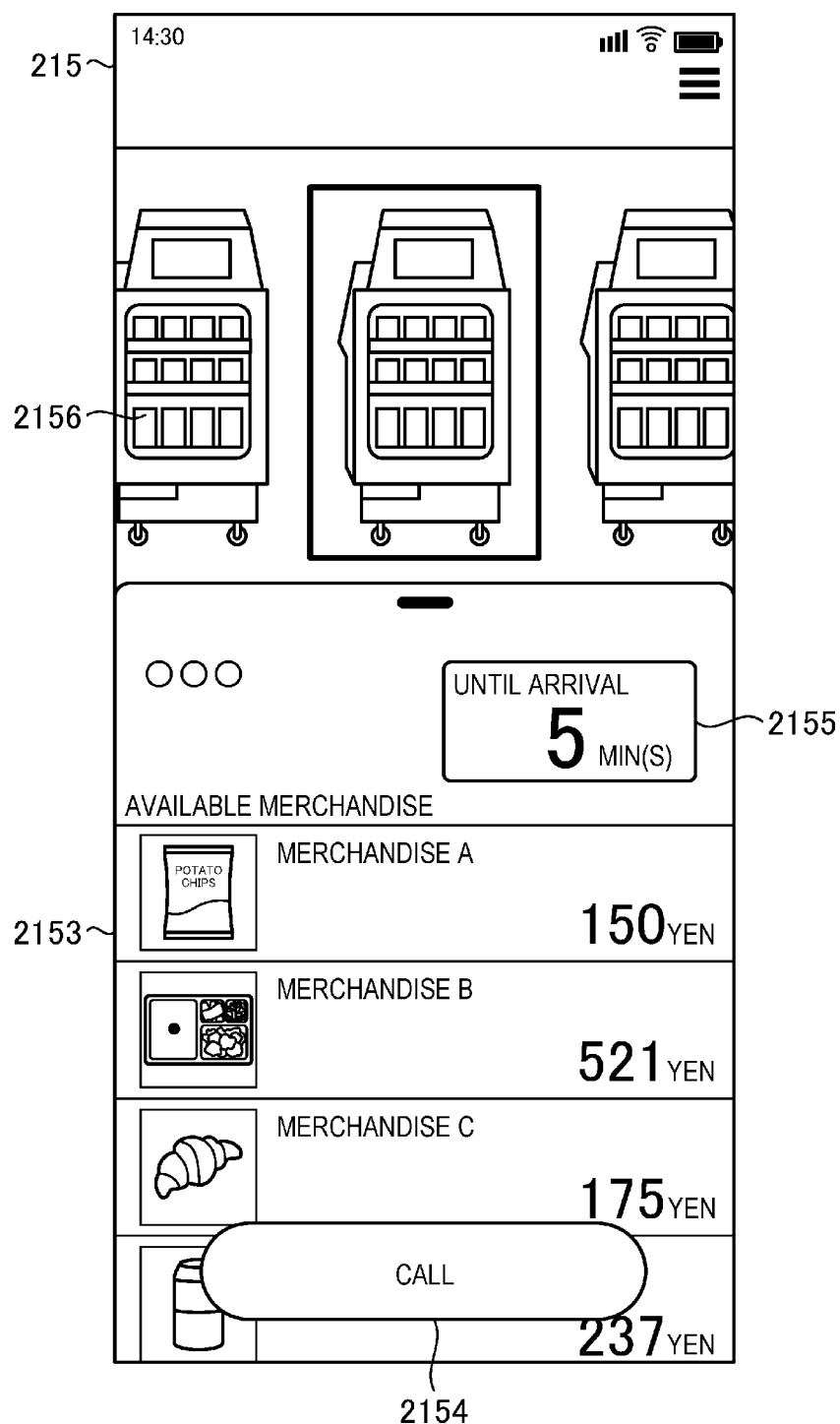
FIG. 18 is a diagram illustrating an example of a third display screen.

FIG. 18 is a diagram illustrating an example of a third display screen displayed on the display unit 215 of the user terminal 20. On the third display screen, the selection of the mobile sales robot 10, the display of the merchandise information on the merchandise mounted on the mobile sales robot 10, and the call of the mobile sales robot 10 can be performed on the same screen.

Specifically, the third display screen includes a robot selection region 2156, the merchandise information display region 2153, the call button 2154, and the arrival time display region 2155.

The robot selection region 2156 is a region for displaying an image (a robot mark) corresponding to each mobile sales robot 10 in a selectable manner. The merchandise information display region 2153 is a region for displaying the merchandise information on the merchandise sold by the mobile sales robot 10 having the robot mark selected in the robot selection region 2156.

Here, images of the robot mark displayed in the robot selection region 2156 corresponds to the mobile sales robots 10 traveling in a predetermined region. The display control unit 2144 causes the robot mark corresponding to each robot ID to be displayed in the robot selection region 2156 based on the robot ID, the position information corresponding to the robot ID, and the like transmitted from the server device 30. The robot selection region 2156 can be scrolled in a left-right direction. The display control unit 2144 updates the robot mark to be displayed according to the scroll operation. Accordingly, the robot selection region 2156 can display all the mobile sales robots 10.

The display control unit 2144 may display the robot ID and the state of the corresponding mobile sales robot in association with each robot mark.

The user can select the mobile sales robot 10 by touching any one of the robot marks displayed in the robot selection region 2156. According to the selection of the mobile sales robot 10, the transmission and reception unit 2141 transmits the merchandise information request designating the robot ID of the selected mobile sales robot 10 to the server device 30, and acquires the merchandise information from the server device 30. Then, the display control unit 2144 displays the merchandise information on the merchandise sold by the mobile sales robot 10 selected in the robot selection region 2156 in the merchandise information display region 2153.

Accordingly, the user can browse the merchandise information on the merchandise accommodated in the selected mobile sales robot 10 through the merchandise information display region 2153. The user can check the merchandise mounted on the mobile sales robot 10 selected in the robot selection region 2156 in the merchandise information display region 2153, and can call the mobile sales robot 10 by touching the call button 2154 when there is a merchandise that the user desires to purchase. Therefore, the user can select the mobile sales robot 10, browse the merchandise information on the merchandise mounted on the selected mobile sales robot 10, and call the mobile sales robot 10 without switching the screen.

In the arrival time display region 2155, an arrival time of the mobile sales robot 10 to be called (or selected) is displayed similarly to the second display screen.

Figure 19:
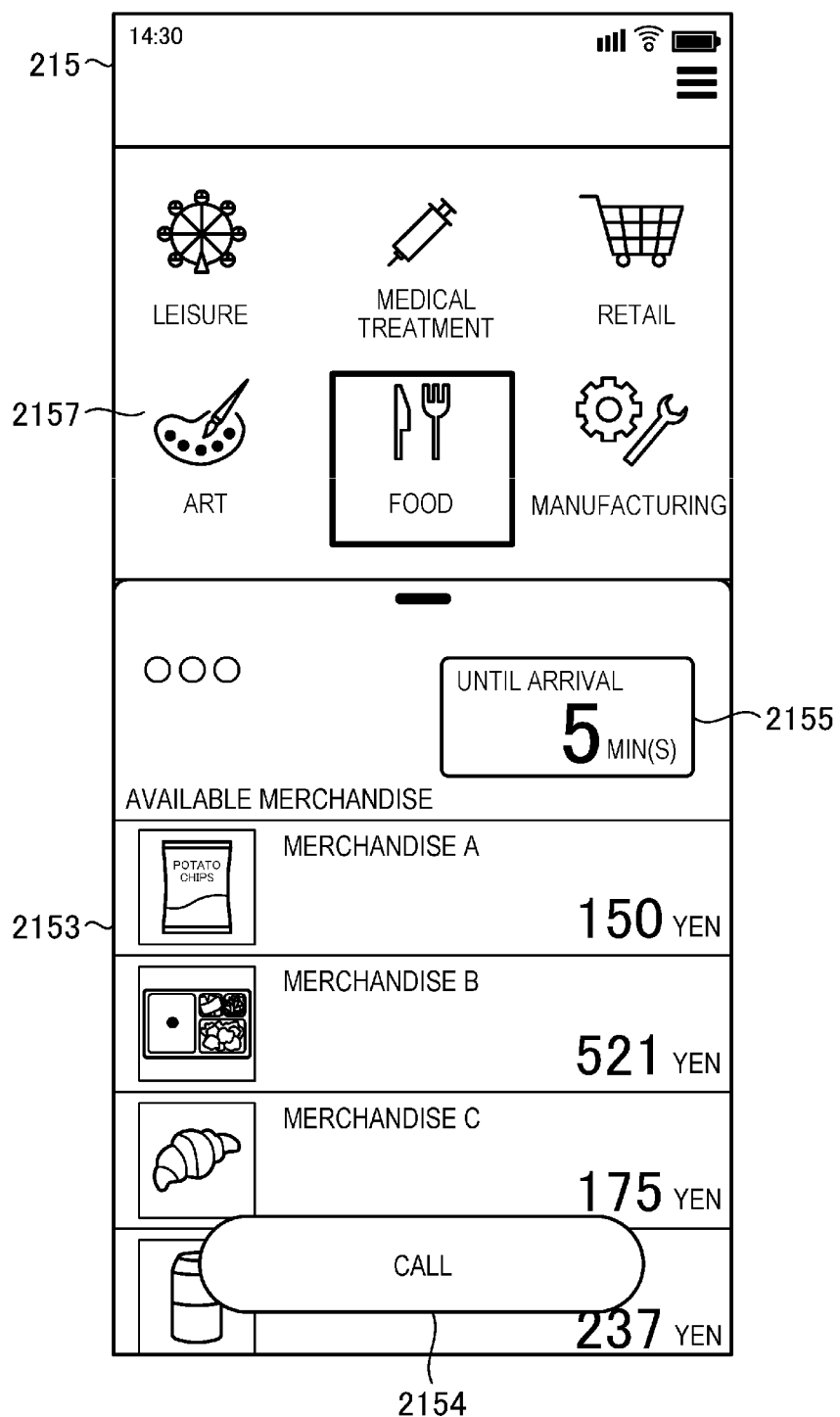
FIG. 19 is a diagram illustrating an example of a fourth display screen.

FIG. 19 is a diagram illustrating an example of a fourth display screen displayed on the display unit 215 of the user terminal 20. On the fourth display screen, instead of explicitly selecting the mobile sales robot 10, by selecting a merchandise or a merchandise type, it is possible to select the mobile sales robot 10 on which the selected merchandise or type is mounted. In the present embodiment, it is possible to select the merchandise type.

Specifically, the fourth display screen includes a merchandise type selection region 2157, the merchandise information display region 2153, the call button 2154, and the arrival time display region 2155.

The merchandise type selection region 2157 is a region for displaying icons indicating merchandise types mounted on the mobile sales robot 10. The display control unit 2144 displays icons indicating the merchandise types mounted on the mobile sales robot 10 in the merchandise type selection region 2157 in a selectable manner. Here, the merchandise types to be displayed as the icons may be determined in advance. The merchandise types to be displayed as the icons may be determined based on a merchandise type) included in the merchandise information for items sold by each of the mobile sale robots 10 from the server device 30.

When the user touches one of the icons displayed in the merchandise type selection region 2157, the transmission and reception unit 2141 transmits identification information for identifying the merchandise type corresponding to the icon to the server device 30. The server device 30 refers to the merchandise management table 3164 and extracts the mobile sales robot 10 on which the merchandise of the appropriate type is mounted. In the present example, it is assumed that the server device 30 includes a management table in which merchandise type and merchandise are associated with each other. The mobile sales robot 10 selected by the server device 30 may be a mobile sales robot 10 on which only merchandise of the merchandise type is mounted or a mobile sales robot 10 on which merchandise of multiple types including the selected type is mounted.

Then, the server device 30 selects one of the extracted mobile sales robots 10 (for example, the mobile sales robot 10 located closest to the position of the user terminal 20). The server device 30 transmits the merchandise information for the merchandise mounted on the selected mobile sales robot 10 to the user terminal 20.

Accordingly, the user can select the mobile sales robot 10 on which the merchandise of the merchandise type indicated by the icon is mounted by touching one of the icons displayed in the merchandise type selection region 2157. The user can browse the merchandise information on the merchandise accommodated in the selected mobile sales robot 10 through the merchandise information display region 2153. The merchandise information display region 2153 is similar to the merchandise information display region 2153 on the second display screen illustrated in FIG. 17, and thus the repeated description will be omitted.

Any of the method for calling the mobile sales robot 10 based on the first display screen and the second display screen, the method for calling the mobile sales robot 10 based on the third display screen, and the method for calling the mobile sales robot 10 based on the fourth display screen may be used. For example, a configuration may be adopted in which the method of calling can be switched according to an operation of a switching button or the like.

The display screens in FIGS. 16 to 19 may be used in combination. For example, the display control unit 2144 first displays the fourth display screen. When the merchandise type is selected on the fourth display screen, the display control unit 2144 displays the first display screen on which the mobile sales robot 10 is selectable. The merchandise of the selected merchandise type is mounted on the mobile sales robot 10. Then, the display control unit 2144 may display the second display screen based on the mobile sales robot 10 selected on the first display screen. In this case, the fourth display screen to be displayed first may include only the merchandise type selection region 2157.

As described above, the user terminal 20 transmits the merchandise information request, receives and displays the merchandise information, and transmits the call request according to a user operation. At this time, the call position of the mobile sales robot 10 is the position of the user. The display control unit 2144 may display a call position designation screen on which the call position of the mobile sales robot 10 can be designated before the call request is transmitted to the server device 30.

Figure 20:
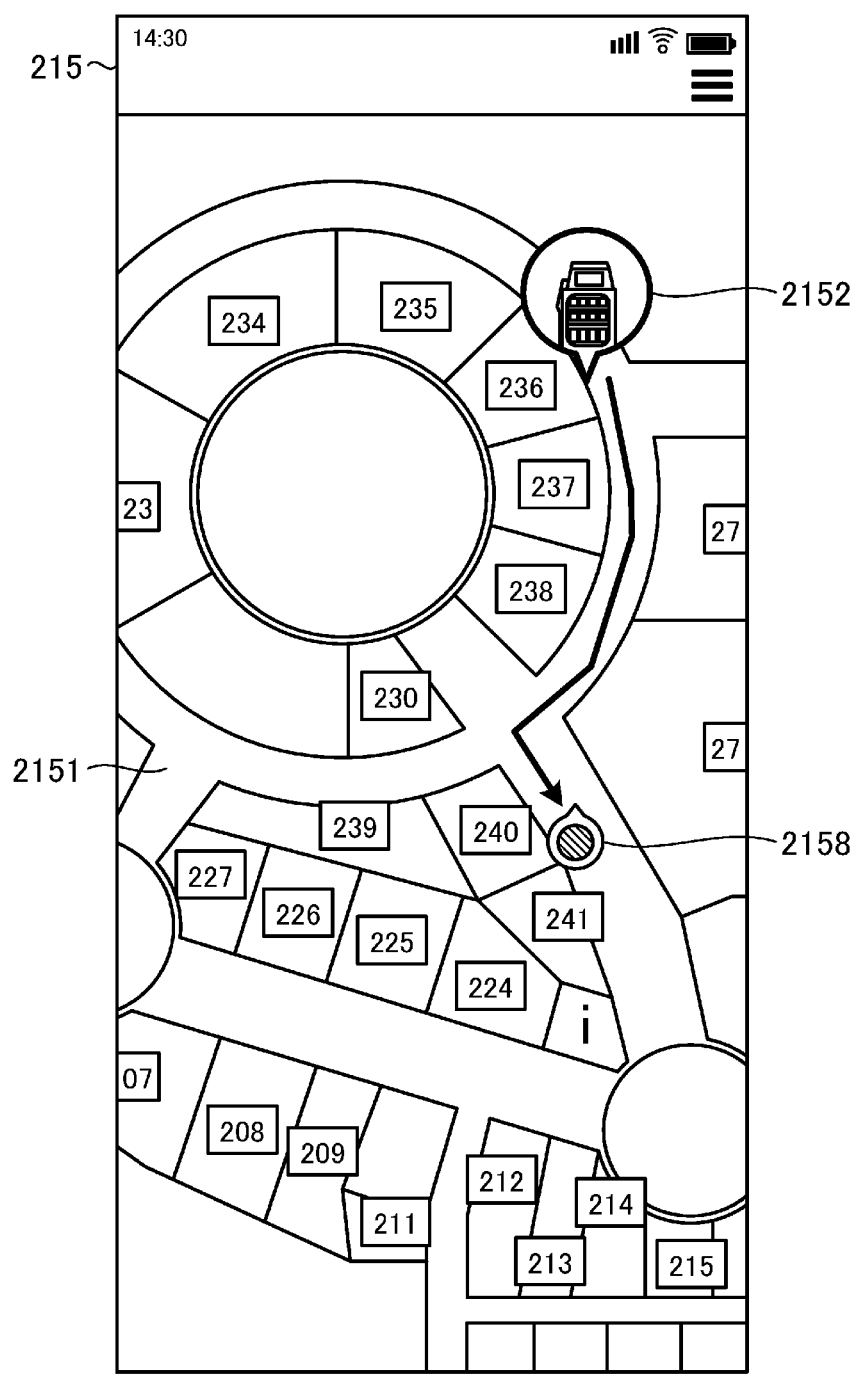
FIG. 20 is a diagram illustrating an example of a call position designation screen.

FIG. 20 is a diagram illustrating an example of the call position designation screen displayed on the display unit 215 of the user terminal 20. The call position designation screen includes, for example, the map display region 2151 similar to that of the first display screen. The display control unit 2144 displays the robot mark 2152 of the selected mobile sales robot 10 on the map of the map display region 2151. On the call position designation screen, the user can designate any position on the map as the call position of the mobile sales robot 10.

The display control unit 2144 displays a designated position mark 2158 at the call position on the map designated by the user. In the designated position mark 2158, the current position of the user, that is, the current position of the user terminal 20 is set as a default. The user can move the designated position mark 2158 to a desired position by, for example, a drag-and-drop operation. Thereafter, when the user performs a predetermined operation, the transmission and reception unit 2141 transmits a call request including the designated call position to the server device 30. For example, when the user touches a call confirmation button or the like displayed on the map display region 2151, the user terminal 20 may transmit the call request to the server device 30.

After the transmission and reception unit 2141 transmits the call request, the display control unit 2144 displays the current position of the mobile sales robot 10 on the map of the map display region 2151 using the robot mark 2152 or the like. The position information is provided from the server device 30.

Accordingly, the user can easily check the current position of the mobile sales robot 10 selected by viewing the map of the map display region 2151.

When the selected mobile sales robot 10 moves to the call position, the display control unit 2144 causes the display unit 215 to display a display screen for notifying that the mobile sales robot 10 arrived at the call position.

The display screen displayed on the display unit 215 by the display control unit 2144 after the mobile sales robot 10 arrives at the call position will be described with reference to FIGS. 21 to 23.

Figure 21:
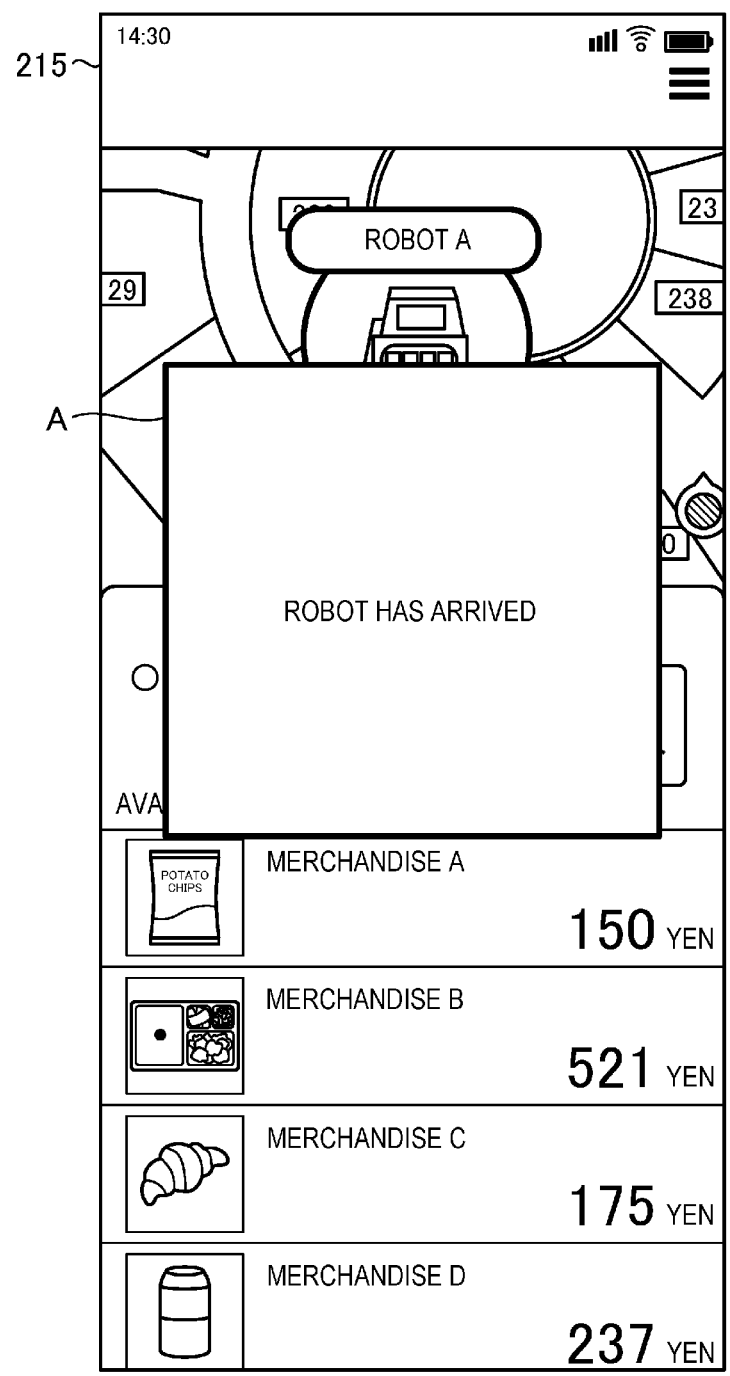
FIG. 21 and FIG. 22 are diagrams illustrating an example of a display screen when a mobile sales device arrives at a call position.

FIG. 21 is a diagram illustrating an example of the display screen displayed on the display unit 215 when the mobile sales robot 10 arrives at the call position. When the mobile sales robot 10 arrives at the call position, a push notification is given from the server device 30 to the user terminal 20. According to the notification from the server device 30, the display control unit 2144 causes the display unit 215 to pop-up display a message A notifying that the mobile sales robot 10 arrives. FIG. 21 illustrates an example in which the message A is pop-up displayed on the above-described second display screen (the same applies to FIGS. 22 and 23).

As described above, when the mobile sales robot 10 arrives at the call position, the display control unit 2144 performs a notification using the display screen. Accordingly, the user can easily recognize that the mobile sales robot 10 arrives at the call position by viewing the display screen (the message A). The notification of the arrival is not limited to the method using the display screen. For example, the display control unit 2144 may cooperate with a notification unit such as a speaker or a vibrator provided in the user terminal 20 to notify that the mobile sales robot 10 arrives at the call position by sound or vibration. The display control unit 2144 may display, on a pop-up screen, a robot number and the robot ID displayed on the mobile sales robot 10 that arrives. Accordingly, the user can more easily recognize the mobile sales robot 10 called by the user. The method for displaying the robot number and the like on the mobile sales robot 10 is not limited.

In the present embodiment, the arrival at the call position is notified according to the notification from the server device 30, and is not limited thereto. The user terminal 20 may independently perform the notification by determining whether the mobile sales robot arrives by the user terminal 20. In this case, for example, the control unit 214 of the user terminal 20 determines whether the position information of the mobile sales robot 10 to be called, which is provided from the server device 30, falls within a predetermined range with the position information (the call position) of the designated position mark 2158 as a base point. Then, when the mobile sales robot 10 enters the predetermined range, the control unit 214 determines that the mobile sales robot 10 arrives at the call position. In this case, the display control unit 2144 causes the display unit 215 to display a display screen for notifying that the mobile sales robot 10 arrives at the call position according to the determination by the control unit 214.

The display screen displayed when the mobile sales robot 10 arrives at the call position is not limited to FIG. 21. Other information may be displayed, for example, as illustrated in FIG. 22.

Figure 22:
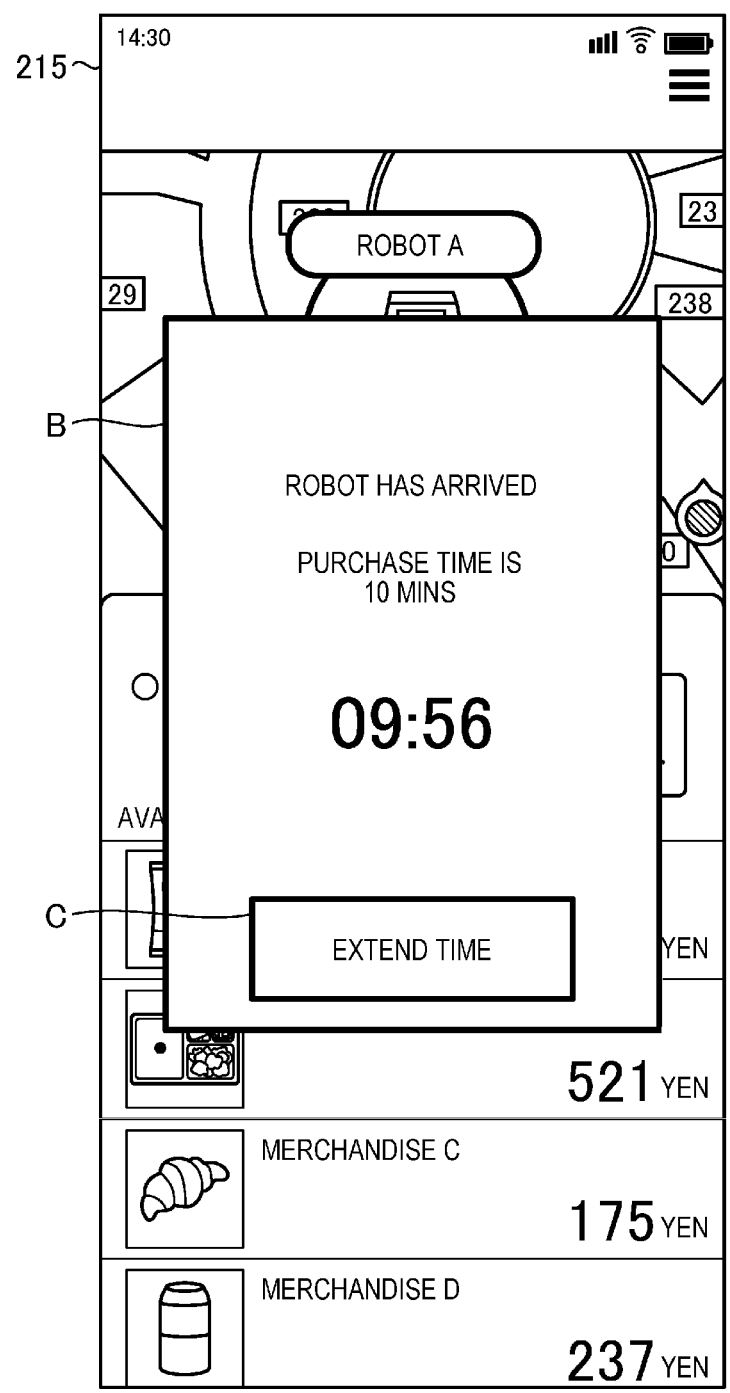
Figure 23:
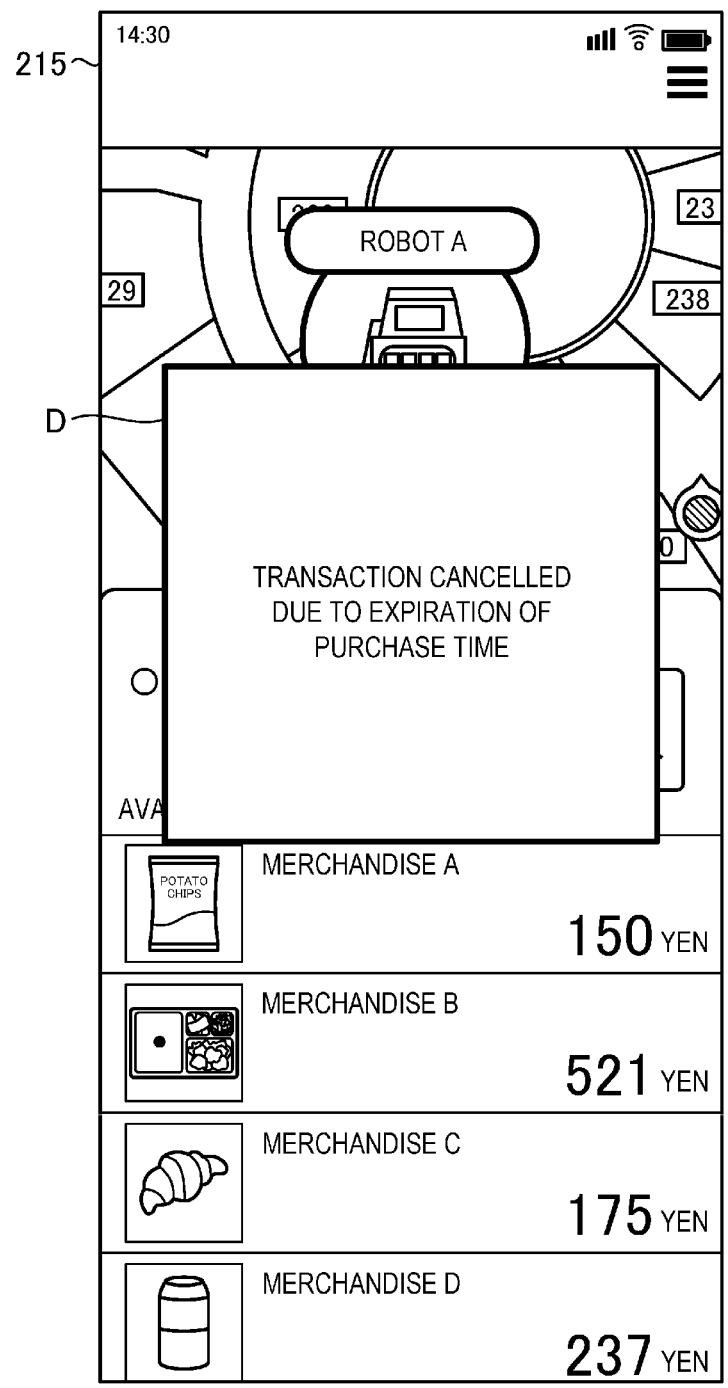
FIG. 23 is a diagram illustrating an example of a display screen when a purchase time limit elapses.

FIG. 22 is a diagram illustrating another example of the display screen displayed by the display unit 215 when the mobile sales robot 10 arrives at the call position. The display screen in FIG. 22 is a display example when a time related to the purchase of the merchandise per user is limited. A time limit related to the purchase of the merchandise is also referred to as a "purchase time limit".

For example, when it is assumed that there are a large number of users who desire to use the mobile sales robot 10, it is desirable to set the purchase time limit for each individual user. This is because there may be users who call the mobile sales robot 10 out of curiosity even though these users have no intention of purchasing the merchandise. The purchase time limit need not always be set, or the setting may be switched between valid and invalid states.

In the present example, when the mobile sales robot 10 arrives at the call position, the display control unit 2144 causes the display unit 215 to pop-up display a message B including a message notifying the user of the arrival of the mobile sales robot 10 at the call position and a message notifying the user of the purchase time limit. At this time, the transmission and reception unit 2141 notifies the server device 30 that the mobile sales robot 10 arrived at the call position. Here, the pop-up displayed purchase time limit may be the purchase time limit itself set in advance, or may be a remaining time of the purchase time limit. The remaining time of the purchase time limit can be derived by the control unit 214 by subtracting a time (an elapsed time) obtained by subtracting a time point at which the mobile sales robot 10 arrives at the call position from a current time point from the purchase time limit set in advance.

Accordingly, the user can recognize, based on the message B, that the mobile sales robot 10 arrives at the call position and that there is a purchase time limit.

In the present example, as illustrated in FIG. 22, the display control unit 2144 may also display a time extension button C for extending the purchase time limit. The user can extend the purchase time limit by some amount by touching the time extension button C.

For example, when the time extension button C is operated, the display control unit 2144 adds an extension time set in advance to the remaining time of the purchase time limit being displayed, corrects the remaining time of the purchase time limit, and displays the corrected remaining time. Then, the transmission and reception unit 2141 transmits an extension notification to the server device 30. The server device 30 recognizes a sales completion time at the call position based on the arrival notification and the extension notification received from the mobile sales robot 10 when the mobile sales robot 10 arrives at the call position. Specifically, the server device 30 recognizes, as the sales completion time, a time point at which the purchase time limit and the extension time elapse from a time point at which the arrival notification is received. The server device 30 can instruct the mobile sales robot 10 to move based on the recognized sales time and the like. For example, when the control unit 214 of the mobile sales robot 10 receives the operation of the time extension button C, the control unit 214 may notify the server device 30 of the extension using the state information by setting the state of the mobile sales robot 10 to a state in which the purchase time limit is extended by the user operation (for example, "during transaction extension").

The method for limiting the purchase of the merchandise by the mobile sales robot 10 when the purchase time limit elapses can be freely set. For example, the settlement of the merchandise subjected to the merchandise registration within the purchase time limit may be enabled, and the merchandise taken out after the purchase time limit elapses may not be registered.

Accordingly, it is possible not to impose an unnecessary time limit on the user who actually purchases merchandise.

In the present example, the display control unit 2144 causes the display unit 215 to display a display screen to notify that the purchase time limit elapses without shopping, when, for example, the merchandise is not taken out. FIG. 23 is a display screen displayed when the purchase time limit elapses without shopping by the user. The display screen is displayed when, for example, no merchandise is taken out from the shelf 112 within the purchase time limit. When the purchase time limit elapses without shopping by the user, the display control unit 2144 causes the display unit 215 to display a message D notifying that the sales of the merchandise performed by the mobile sales robot 10 is cancelled.

Accordingly, the user can recognize that the mobile sales robot 10 moves to the next call position or the like.

In the present embodiment, the call request is transmitted from the user terminal 20 carried by the user to the server device 30, and is not limited thereto. The call request may be transmitted from a terminal device provided in a facility in which the mobile sales robot 10 travels to the server device 30. In this case, it is desirable that the terminal device allows the user to set the call position to any place.

Referring back to FIG. 15, the functional aspects of the server device 30 will be described. The control unit 314 of the server device 30 functions as a transmission and reception unit 3141, an information management unit 3142, a collation unit 3143, a settlement unit 3144, and a robot management unit 3145 when the CPU 311 operates according to a control program stored in the ROM 312 or the storage unit 316. The functions may be implemented by hardware such as a dedicated circuit.

The transmission and reception unit 3141 transmits and receives various types of information to and from an external device such as the user terminal 20 or each mobile sales robot 10 via the communication unit 315. For example, the transmission and reception unit 3141 receives, from each mobile sales robot 10, position information indicating the position of the mobile sales robot 10 and state information indicating the state of the mobile sales robot 10. The transmission and reception unit 3141 transmits, to the user terminal 20, the position information indicating the position of each mobile sales robot 10 and state information indicating the state of each mobile sales robot 10. The transmission and reception unit 3141 receives a merchandise information request from the user terminal 20, and transmits merchandise information corresponding to the merchandise information request to the user terminal 20.

The transmission and reception unit 3141 receives a call request from the user terminal 20 and transmits a movement instruction to the mobile sales robot 10 identified by the robot ID included in the call request. The movement instruction instructs the mobile sales robot 10 to move to the call position included in the call request from the user terminal 20. The movement instruction includes information such as the terminal ID and the call position of the user terminal 20 that transmits the call request.

The transmission and reception unit 3141 receives an arrival notification from the mobile sales robot 10 and transmits the arrival notification to the user terminal 20 which is a request source of the call request of the mobile sales robot 10. The arrival notification indicates that the mobile sales robot 10 arrives at the designated call position. The arrival notification includes information such as the robot ID of the mobile sales robot that arrives at the call position.

The transmission and reception unit 3141 transmits a pin code (or other authentication information) to the user terminal 20 in response to the call request, and receives a pin code input to the mobile sales robot 10 by the user from the mobile sales robot 10. When the collation unit 3143 collates the pin code transmitted to the user terminal 20 with the pin code input to the mobile sales robot 10, the transmission and reception unit 3141 transmits an authentication notification to the mobile sales robot 10. The authentication notification indicates that the user who called the mobile sales robot 10 and the user who intends to start shopping at the mobile sales robot 10 match with each other.

The transmission and reception unit 3141 receives a settlement request from the mobile sales robot 10 and transmits a settlement completion notification to the mobile sales robot 10 and the user terminal 20 when the settlement is successfully performed according to the settlement request. The settlement request is a request for price settlement for the merchandise purchased by the user at the mobile sales robot 10. The settlement request includes information necessary for the settlement executed by the server device 30. The information necessary for the settlement is face image data of the user in the present embodiment. Instead of the face image data, the user ID or the like may be used. The settlement completion notification indicates that the settlement according to the settlement request is completed. The settlement completion notification includes information such as a transaction ID for identifying the transaction after settlement.

The information management unit 3142 stores, based on the information received by the transmission and reception unit 3141, information in the storage unit 316 or updates various types of information stored in the storage unit 316. The information management unit 3142 appropriately reads various types of information transmitted by the transmission and reception unit 3141 from the storage unit 316.

For example, the information management unit 3142 updates the robot management table 3163 based on the position information and the state information received by the transmission and reception unit 3141 from the mobile sales robot 10. When the transmission and reception unit 3141 receives the merchandise information request, the information management unit 3142 reads the merchandise code corresponding to the robot ID included in the merchandise information request from the merchandise management table 3164. Then, the information management unit 3142 reads the merchandise information corresponding to the merchandise code with reference to the merchandise master 3162.

When the transmission and reception unit 3141 receives the call request or the arrival notification, the information management unit 3142 stores information in the call management table 3166 as appropriate. When the transmission and reception unit 3141 receives the settlement request, the information management unit 3142 stores various types of information in the transaction management table 3167 and reads the settlement information from the user management table 3165. Specifically, the information management unit 3142 reads the settlement information from the user management table 3165 based on the face image data included in the settlement request. When the settlement has been completed by the settlement unit 3144, the information management unit 3142 updates the settlement flag of the transaction management table 3167.

The information management unit 3142 manages a movement order of the mobile sales robot 10 to the call position. Specifically, the information management unit 3142 moves the mobile sales robot 10 to the call position designated by the call request in order from the call request having the earliest call date and time with respect to the call request whose arrival date and time is not registered in the call management table 3166.

The collation unit 3143 determines whether the user who called the mobile sales robot 10 matches with the user who now intends to start shopping at the mobile sales robot 10. Specifically, when the transmission and reception unit 3141 receives a call request from the user terminal 20, the collation unit 3143 issues a pin code associated with the call request. Then, the collation unit 3143 compares whether a pin code received from the mobile sales robot 10 matches with the issued pin code.

The collation unit 3143 may perform a comparison between the user who called the mobile sales robot 10 and the user who now intends to start shopping at the mobile sales robot 10 using face authentication. In this case, the transmission and reception unit 3141 receives the face image data from the mobile sales robot. Then, the collation unit 3143 refers to the user management table 3165, and performs the comparison based on feature data of the received face image data and feature data of the face of the user who called.

In the mobile sales system 1, it may not always be essential to confirm that the user who called the mobile sales robot 10 matches with the user who indicates an intention to start shopping at the mobile sales robot 10. In other words, the server device 30 may omit the function of the collation unit 3143 in some examples.

The settlement unit 3144 executes the settlement related to the settlement request received by the transmission and reception unit 3141 from the mobile sales robot 10. In the present embodiment, the settlement unit 3144 executes the electronic settlement by the face authentication. Specifically, the settlement unit 3144 performs the settlement with a settlement business operator using the settlement information read by the information management unit 3142 based on the face image data. The settlement unit 3144 executes the settlement by communicating with a settlement server of the settlement business operator. The settlement unit 3144 may execute the electronic settlement by credit card settlement or two-dimensional code settlement.

The robot management unit 3145 sets, based on the call request from the user terminal 20, the position information and the state information from each mobile sales robot 10, and the like, a transmission destination to which the transmission and reception unit 3141 transmits the information and a transmission content. For example, when the transmission and reception unit 3141 receives the call request from the user terminal 20, the robot management unit 3145 sets the mobile sales robot 10 having the robot ID included in the call request as the transmission destination of the movement instruction, and sets the call position included in the call request as the transmission content. For example, the robot management unit 3145 checks the state information of each mobile sales robot 10 stored in the robot management table 3163, and selects the mobile sales robot 10 corresponding to the call request from among the mobile sales robots 10 in the state of "waiting for call".

In addition, the robot management unit 3145 sets the user terminal 20, which is the request source of the call request, as the transmission destination, calculates the arrival time until the selected mobile sales robot 10 arrives at the call position, and sets the arrival time as the transmission content. The arrival time is calculated based on, for example, the number of call requests (still waiting requests whose arrival date and time are not registered) to the corresponding mobile sales robot 10 registered in the call management table 3166, the purchase time limit in one transaction set in advance, and the position information and the state information of the mobile sales robot 10 registered in the robot management table 3163.

The robot management unit 3145 refers to the merchandise management table 3164, sends the mobile sales robot 10 having the robot ID whose stock quantity has become zero for any or all of the merchandise to be mounted a movement instruction, and sets the position at which the merchandise is replenished as a movement destination.

A part or all of the functions of the transmission and reception unit 3141, the information management unit 3142, the collation unit 3143, the settlement unit 3144, and the robot management unit 3145 described above may be provided in the mobile sales robot 10. In this case, the user terminal 20 transmits and receives various types of information to and from the mobile sales robot 10.

Next, the functional configuration of the mobile sales robot 10 will be described. The control unit 154 of the mobile sales robot 10 functions as a transmission and reception unit 1541, an input reception unit 1542, a self-position identifying unit 1543, an information processing unit 1544, a drive control unit 1545, and a display control unit 1546 when the CPU 151 operates according to a control program stored in the ROM 152 or the storage unit 162. In some examples, described functions may be implemented by hardware such as a dedicated circuit.

The transmission and reception unit 1541 transmits and receives various types of information to and from an external device such as the server device 30 via the communication unit 161. For example, the transmission and reception unit 1541 transmits, to the server device 30, position information indicating a position of the transmission and reception unit 1541 and state information indicating a state of the transmission and reception unit 1541 as needed.

The transmission and reception unit 1541 transmits an authentication request to the server device 30 and receives an authentication notification from the server device 30. The authentication request is for requesting authentication of a pin code input to the input reception unit 1542, and includes the pin code and the robot ID that are received by the input reception unit 1542. The authentication notification is trigger information for permitting a process related to sales of the merchandise. Therefore, the transmission and reception unit 1541 functions as an input unit to which the trigger information is input. The transmission and reception unit 1541 transmits a settlement request to the server device 30 and receives a settlement completion notification from the server device 30.

The input reception unit 1542 receives input information based on an operation of the operation unit 156. For example, the input reception unit 1542 receives a pin code or a settlement instruction input by an operation of the user.

The self-position identifying unit 1543 identifies the position of the mobile sales robot 10 in the map information 1621 based on an output of the positioning unit 160.

The information processing unit 1544 executes various processes based on various types of information input to the mobile sales robot 10.

For example, when the transmission and reception unit 1541 receives a movement instruction from the server device 30, the information processing unit 1544 determines a movement route to the call position based on the map information 1621.

When the weight detection unit 159 detects the weight change of the shelf 112, the information processing unit 1544 reads the merchandise code corresponding to the shelf ID of the shelf 112 having the weight change from the accommodated merchandise table 1623, and identifies the merchandise taken out from the shelf 112 or the merchandise returned to the shelf 112. The information processing unit 1544 functions as a detection unit that detects the merchandise taken out from the mounting portion.

For example, when the weight change is a decrease in weight, the information processing unit 1544 reads the merchandise code stored in association with the shelf ID of the shelf 112 having the weight change. Then, the information processing unit 1544 refers to the merchandise master 1622 and identifies the merchandise code corresponding to the decreased weight among weights associated with the read merchandise codes, thereby identifying the merchandise taken out from the shelf 112. In this case, the information processing unit 1544 reads merchandise information corresponding to the identified merchandise code from the merchandise master 1622 and registers the merchandise information in the RAM 153 (also referred to as "merchandise registration"). That is, the information processing unit 1544 also functions as a registration unit that executes the merchandise registration. The information processing unit 1544 subtracts the quantity of the identified merchandise codes stored in the accommodated merchandise table 1623 by the number of items taken out from the shelf 112.

For example, when the weight change is an increase in weight, the information processing unit 1544 reads the merchandise code stored in association with the shelf ID of the shelf 112 having the weight change. Then, the information processing unit 1544 refers to the merchandise master 1622 and identifies the merchandise code corresponding to the increased weight among the weights associated with the read merchandise codes, thereby identifying the merchandise returned to the shelf 112. In this case, the information processing unit 1544 deletes the merchandise information corresponding to the identified merchandise code registered in the RAM 153. The information processing unit 1544 increases the quantity of the identified merchandise codes stored in the accommodated merchandise table 1623 by the number of items returned to the shelf 112.

The registration of the merchandise information may be executed by the server device 30. Specifically, the information processing unit 1544 transmits the merchandise code of the merchandise taken out from the shelf 112 to the server device 30 in the same manner as described above. Then, the server device 30 reads the merchandise information on the merchandise corresponding to the received merchandise code from the merchandise master 3162 and registers the merchandise information. In this case, the information processing unit 1544 has a function of causing the server device 30 to register the merchandise information, and can be said to function as the registration unit that executes the merchandise registration.

When the input reception unit 1542 receives the settlement instruction, the information processing unit 1544 executes the payment. The payment is a part or all of a process for the user to pay a purchase price of the merchandise, and includes calculation of the purchase price of the merchandise subjected to the merchandise registration, acquisition of the face image data, and transmission of the settlement request in the present embodiment.

When the mobile sales robot 10 executes the settlement executed by the server device 30, the payment executed by the information processing unit 1544 includes the settlement. The mobile sales robot 10 may include an automatic coin machine or the like for cash settlement. In this case, the information processing unit 1544 controls the automatic coin machine. In this way, the information processing unit 1544 functions as a payment unit that executes the payment for part or all of the process related to the payment of the purchase price.

The information processing unit 1544 executes sound recognition on the sound collected by the sound collection unit 157 from the periphery, and outputs a stop instruction to the drive control unit 1545 as necessary. For example, when the information processing unit 1544 recognizes a sound for stopping the mobile sales robot 10 by the sound recognition, the information processing unit 1544 outputs the stop instruction to the drive control unit 1545.

When the transmission and reception unit 1541 receives the authentication notification from the server device 30, the information processing unit 1544 permits the process related to the sales of the merchandise. That is, when the user who called the mobile sales robot 10 and the user who now intends to start shopping are determined to match with each other by the collation unit 3143 of the server device 30, the information processing unit 1544 permits the process related to the sales of the merchandise.

For example, the information processing unit 1544 cooperates with the display control unit 1546 to display an initial screen for starting shopping on the display unit 155, thereby permitting the process related to the sales of the merchandise. When a lockable door is provided in the accommodation portion 111, the information processing unit 1544 permits the process related to the sales of the merchandise by releasing a lock of the door. When the user who called the mobile sales robot 10 and the user who intends to start shopping match, the information processing unit 1544 functions as a permission unit that permits the process related to the sales of the merchandise.

In the present embodiment, the trigger information for permitting sales of the merchandise at the call position is the authentication notification from the server device 30. However, the trigger information is not set during the circulate traveling of the mobile sales robot 10. This is because, during the circulate traveling of the mobile sales robot 10, the mobile sales robot 10 stops at a sales position based on the sound of the user, that is, in this case, the call request and the pin code corresponding to the call request are not issued. For the sales of the merchandise during the circulate traveling of the mobile sales robot 10, the trigger information for permitting the process related to the sales of the merchandise may not be set, or other information different from the authentication notification may be used as the trigger information.

For example, the trigger information may be detection that the user makes eye contact with the imaging unit 134, detection that the user performs a predetermined action such as blinking in front of the imaging unit 134, detection that the user operates the disinfection device 135, or the like. The user who purchases the merchandise during the circulate traveling of the mobile sales robot 10 can purchase the merchandise by the settlement based on the face authentication when the settlement information is registered in the user management table 3165 in advance. When the mobile sales robot 10 includes a settlement device such as a card settlement terminal or a coin machine, a user can purchase merchandise regardless of whether the settlement information is registered.

For the sales of the merchandise at the designated call position, the trigger information for permitting the processes related to the sales of the merchandise may be other information instead of the authentication notification, or may be information simply indicating that the mobile sales robot 10 arrives at the call position. Specific trigger information for permitting the processes related to the sales of the merchandise may not be required.

The information processing unit 1544 executes alarming for issuing an alarm as necessary. For example, when it is detected that the merchandise is illegally taken out from the shelf 112 while the mobile sales robot 10 is traveling or in a state in which the process related to the sales of the merchandise is not permitted, the information processing unit 1544 executes the alarming. The alarming causes the light emitting unit 114 to emit light in order to notify the surroundings of an abnormality. The color is changed to a color indicating a warning, and an alarm sound is generated from a speaker or the like.

The information processing unit 1544 may execute the alarming when it is detected that the merchandise is about to be taken out illegally. For example, when it is detected that a hand has been inserted into the accommodation portion 111 while the mobile sales robot 10 is traveling or the processing related to the sales of the merchandise is not presently permitted, the alarming may be executed. The information processing unit 1544 functions as an alarm unit that issues an alarm when it is detected that merchandise taken out illegally or is about to be taken out illegally.

The drive control unit 1545 controls the drive unit 123 to cause the mobile sales robot 10 to travel or stop. Under the control of the drive control unit 1545, the mobile sales robot 10 performs the circulate traveling along the predetermined route and the call traveling toward the call position designated by the customer.

The drive control unit 1545 moves the mobile sales robot 10 to, for example, a maintenance yard (storage room) when it is detected that any one item or all items accommodated in the accommodation portion 111 are out of stock. This is to replenish the merchandise out of stock. When the mobile sales robot 10 travels in a shopping mall or the like, the drive control unit 1545 may move the mobile sales robot 10 to a store that sells the merchandise out of stock.

The display control unit 1546 controls the display unit 155 to display various types of information on the display unit 155. The display control unit 1546 causes the first display unit 131, the second display unit 132, and the third display unit 133 to display contents corresponding to the arrangement positions. For example, the first display unit 131 displays information related to the merchandise taken out from the accommodation portion 111. The second display unit 132 displays information related to sales promotion of the merchandise, such as information for advertising the merchandise accommodated in the accommodation portion 111. The third display unit 133 displays information related to the settlement of the merchandise, such as information for guiding a merchandise settlement method. When the shelf label 113 is an electronic shelf label, the display control unit 1546 also controls the display of the electronic shelf label.

Figure 24:
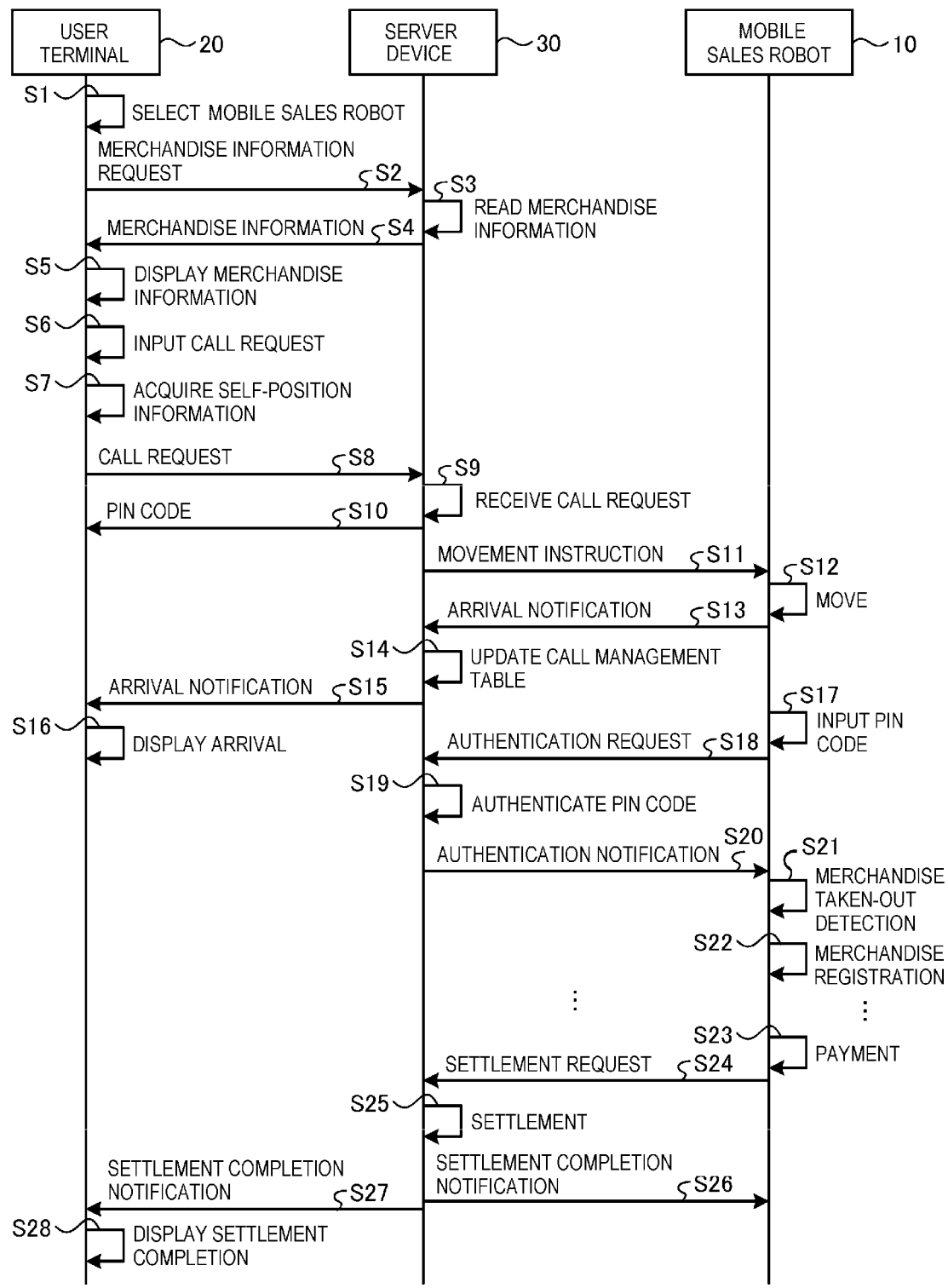
FIG. 24 is a sequence chart illustrating an example of an operation of a mobile sales system.

An operation of the mobile sales system 1 including the devices having the above-described configurations will be described. FIG. 24 is a sequence chart illustrating an example of the operation of the mobile sales system 1. The sequence chart illustrates a case in which the user checks the merchandise information on the merchandise mounted on the mobile sales robot 10, calls the mobile sales robot 10, and purchases the merchandise by the mobile sales robot 10.

When calling the mobile sales robot 10, the user activates an application program of the mobile sales system 1 provided in the user terminal 20. When the merchandise information request menu is selected, the user terminal 20 displays the first display screen illustrated in FIG. 16 and receives the selection of the mobile sales robot 10 (Act 1). The user terminal 20 transmits a merchandise information request including the robot ID of the selected mobile sales robot 10 and the terminal ID of the user terminal 20 to the server device 30 (Act 2).

The server device 30 reads the merchandise information from the storage unit 316 according to the received merchandise information request (Act 3). Specifically, the server device 30 reads a merchandise code corresponding to the robot ID included in the merchandise information request from the merchandise management table 3164. Next, the server device 30 reads merchandise information corresponding to the read merchandise code from the merchandise master 3162. The server device 30 transmits the read merchandise information to the user terminal 20 (Act 4). A communication address of the user terminal 20 may be registered in the user management table 3165 in advance or may be included in the merchandise information request.

The user terminal 20 displays the received merchandise information on the display unit 215 (Act 5). When the user checks the displayed merchandise information and there is a merchandise to be purchased, the user performs an operation for calling the mobile sales robot on which the merchandise is mounted. Accordingly, a call request is input to the user terminal 20 (Act 6). The user terminal 20 acquires position information of a place where the user terminal 20 is present (Act 7), and transmits a call request in which the acquired position information is set as a call position to the server device 30 (Act 8).

Upon receiving the call request, the server device 30 executes call request reception (Act 9). The call request reception will be described in detail later. The server device 30 transmits a pin code issued in the call request reception to the user terminal 20 (Act 10). The server device 30 transmits a movement instruction including the call position to the mobile sales robot 10 designated by the call request (Act 11).

The mobile sales robot 10 controls the drive unit 123 to move to the call position designated by the movement instruction (Act 12). When the mobile sales robot 10 arrives at the call position, the mobile sales robot 10 transmits an arrival notification to the server device 30 (Act 13). The mobile sales robot 10 may transmit only the position information indicating the position where the mobile sales robot 10 is present to the server device 30. The server device 30 may determine the arrival of the mobile sales robot 10 at the call position.

The server device 30 updates the call management table 3166 based on the received arrival notification (Act 14). Specifically, the server device 30 registers an arrival date and time of the call request in the call management table 3166. Next, the server device 30 transmits an arrival notification to the user terminal 20 which is the request source of the call request (Act 15).

When the user terminal 20 receives the arrival notification, the user terminal 20 displays, on the display unit 215, information indicating that the called mobile sales robot 10 arrives (Act 16). Accordingly, the user recognizes the arrival of the mobile sales robot 10 and inputs the pin code received from the server device 30 to the operation unit 156 of the mobile sales robot 10.

When the mobile sales robot 10 receives the input of the pin code (Act 17), the mobile sales robot 10 transmits an authentication request including the input pin code and robot ID to the server device 30 (Act 18).

The server device 30 authenticates the pin code (Act 19). Specifically, when a combination of the pin code and the robot ID included in the received authentication request is stored in the call management table 3166, the server device 30 authenticates the pin code. The server device 30 authenticates the pin code, and transmits an authentication notification to the mobile sales robot 10 when it is recognized that the user who issues the call request and the user who is about to start shopping match with each other (Act 20).

When the mobile sales robot 10 receives the authentication notification, the mobile sales robot 10 permits a process related to the sales of the merchandise. Then, when it is detected that the merchandise is taken out from the accommodation portion 111 (Act 21), the merchandise registration is executed for the merchandise (Act 22). The mobile sales robot 10 executes the merchandise registration every time the merchandise is taken out from the shelf 112, and cancels the merchandise registration when the merchandise is returned to the shelf 112. When a payment instruction is input, the mobile sales robot 10 executes payment processing (Act 23). Then, the mobile sales robot 10 transmits a settlement request to the server device 30 based on the received payment (Act 24).

The server device 30 executes settlement processing based on the received settlement request (Act 25). When the settlement is normally completed, the server device 30 transmits a settlement completion notification to the mobile sales robot 10 (Act 26) and also transmits the settlement completion notification to the user terminal 20 (Act 27). When the user terminal 20 receives the settlement completion notification, the user terminal 20 displays, on the display unit 215, information indicating that the settlement is completed (Act 28).

By the above operation, the mobile sales system 1 can move the mobile sales robot 10 on which the merchandise is mounted to the position designated by the user to sell the merchandise.

Figure 25:
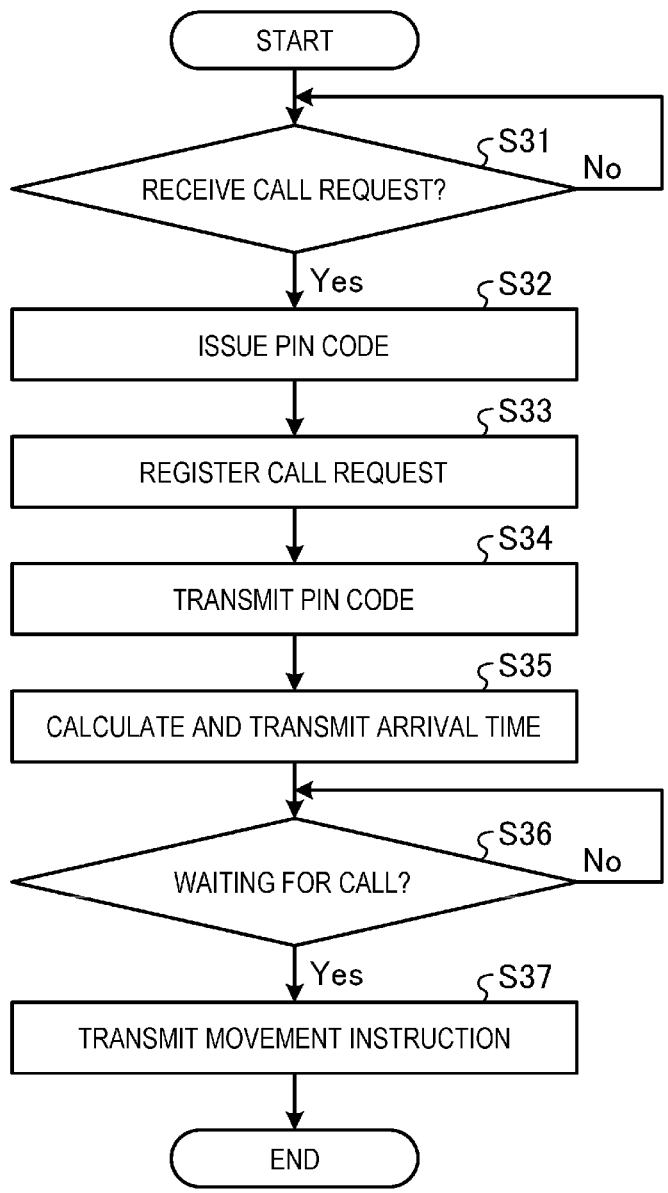
FIG. 25 is a flowchart of call request reception executed by a control unit of a server device.

Next, the call request reception executed by the server device 30 will be described. FIG. 25 is a flowchart illustrating an example of a flow of the call request reception executed by the control unit 314 of the server device 30.

The control unit 314 determines whether the transmission and reception unit 3141 receives a call request from the user terminal 20 (Act 31). When the transmission and reception unit 3141 does not receive the call request (N in Act 31), the process returns to Act 31 and waits. When the transmission and reception unit 3141 receives the call request (Y in Act 31), the control unit 314 issues a pin code associated with the call request (Act 32).

The information management unit 3142 registers information related to the call request received by the transmission and reception unit 3141 in the call management table 3166 (Act 33). Next, the transmission and reception unit 3141 transmits the issued pin code to the user terminal 20 which is the request source of the call request (Act 34).

The robot management unit 3145 calculates an arrival time until the mobile sales robot 10 designated by the call request arrives at the call position, and transmits the calculated arrival time to the user terminal 20 (Act 35). The robot management unit 3145 refers to the robot management table 3163 and calculates the arrival time based on the position of the mobile sales robot 10 and the call position when the state of the designated mobile sales robot 10 is "waiting for call" capable of responding to the call from the user.

When the state of the designated mobile sales robot 10 is not "waiting for call", the robot management unit 3145 calculates the arrival time in consideration of other information. Here, the other information is, for example, the number of call requests (still waiting requests whose arrival date and time are not registered) to the designated mobile sales robot 10 registered in the call management table 3166, and a purchase time limit in one transaction set in advance.

The robot management unit 3145 determines whether the state of the mobile sales robot 10 designated by the call request is "waiting for call" (Act 36). When the mobile sales robot 10 is "waiting for call" (Y in Act 36), the transmission and reception unit 3141 transmits a movement instruction including the terminal ID and the call position of the user terminal 20 to the designated mobile sales robot 10 (Act 37). Then, the control unit 314 ends the call request reception.

When the state of the designated mobile sales robot 10 is not "waiting for call" (N in Act 36), that is, when the mobile sales robot 10 cannot immediately start moving to the call position, the control unit 314 returns to Act 36.

Through the call request reception, the server device 30 can manage the call requests from the user terminals 20 and move the designated mobile sales robot 10 to the call position in the order in which the call requests are received.

Figure 26:
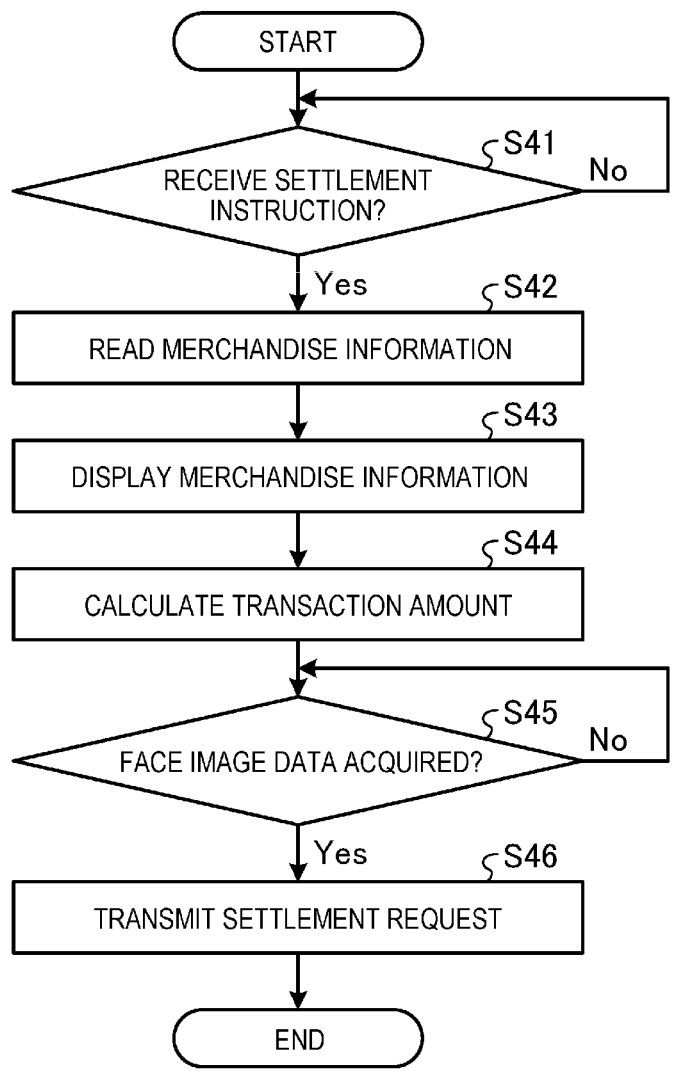
FIG. 26 is a flowchart of payment flow executed by a control unit of a mobile sales device.

Next, the payment executed by the mobile sales robot 10 will be described. FIG. 26 is a flowchart illustrating an example of a flow of the payment executed by the control unit 154 of the mobile sales robot.

The control unit 154 determines whether the input reception unit 1542 receives a settlement instruction (Act 41). When the input reception unit 1542 does not receive the settlement instruction (N in Act 41), the process returns to Act 41 and waits. When the input reception unit 1542 receives the settlement instruction (Y in Act 41), the information processing unit 1544 reads the merchandise information on the merchandise subjected to the merchandise registration (Act 42).

The display control unit 1546 causes the first display unit 131 to display the merchandise information read by the information processing unit 1544 (Act 43). The information processing unit 1544 calculates, based on the read merchandise information, a transaction amount, that is, a total amount of prices of items subjected to the merchandise registration (Act 44). The calculated transaction amount is temporarily stored in the RAM 153.

The control unit 154 determines whether the information processing unit 1544 acquires face image data from the imaging unit 134 (Act 45). When the information processing unit 1544 does not acquire the face image data (N in Act 45), the process returns to Act 45 and waits. In other words, the control unit 154 determines whether the imaging unit 134 captures an image of the face of the user who purchases the merchandise in order to perform the settlement by face authentication.

When the information processing unit 1544 acquires the face image data from the imaging unit 134 (Y in Act 45), the transmission and reception unit 1541 transmits a settlement request to the server device 30 (Act 46). The settlement request includes the face image data, the merchandise information, the transaction amount, and the like. Then, the control unit 154 ends the payment.

Through the payment, the mobile sales robot 10 can provide the server device 30 with information necessary for the server device 30 to perform the settlement, and can complete the payment of the purchase price of the user in cooperation with the server device 30.

Figure 27:
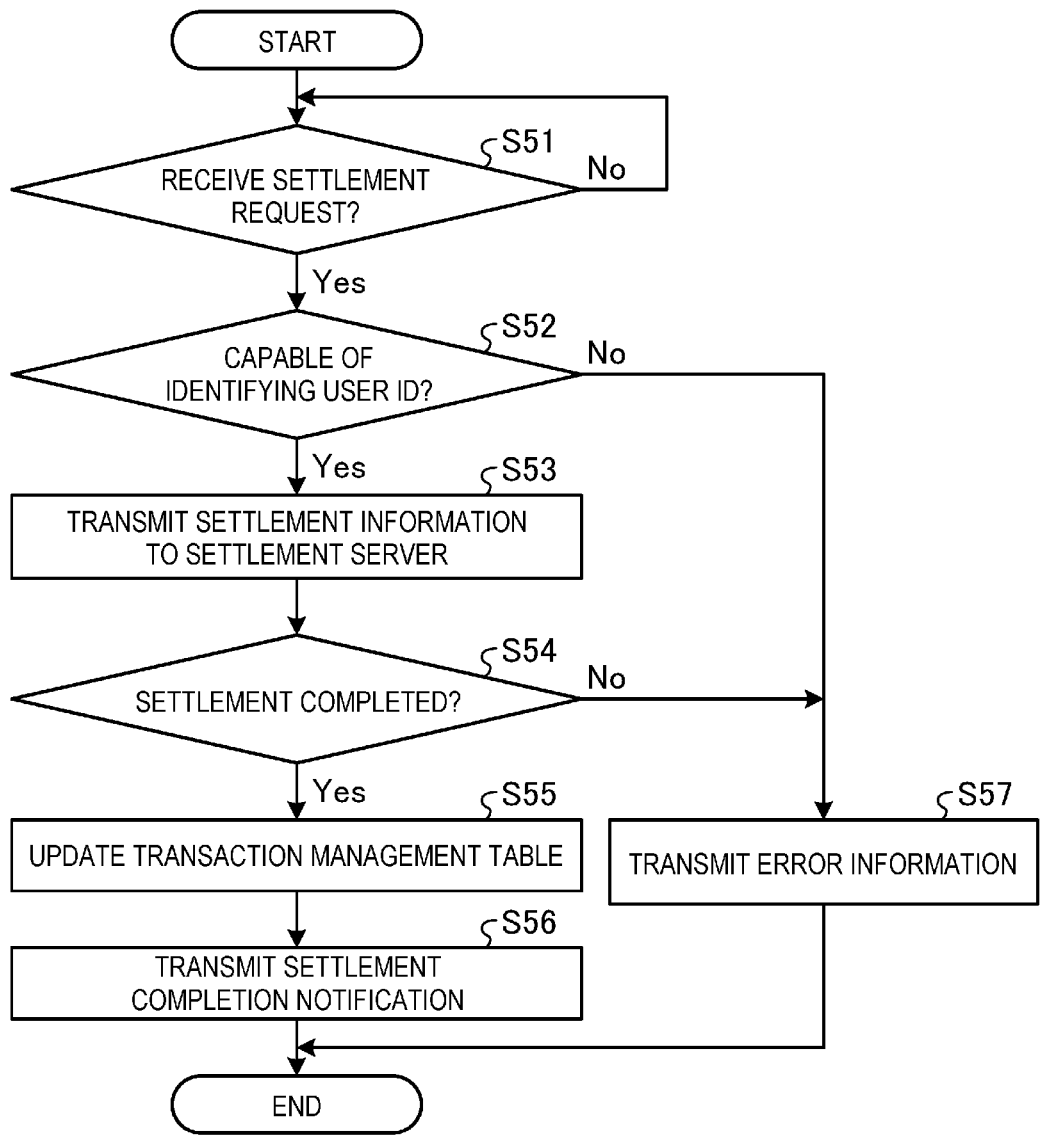
FIG. 27 is a flowchart of settlement flow executed by a control unit of a server device.

Next, the settlement executed by the server device will be described. FIG. 27 is a flowchart illustrating an example of a flow of the settlement by the control unit 314 of the server device.

The control unit 314 determines whether the transmission and reception unit 3141 receives a settlement request from the mobile sales robot 10 (Act 51). When the transmission and reception unit 3141 does not receive the settlement request (N in Act 51), the process returns to Act 51 and waits.

When the transmission and reception unit 3141 receives the settlement request (Y in Act 51), the settlement unit 3144 determines whether the user ID can be identified by the face image data included in the settlement request (Act 52). Specifically, the settlement unit 3144 refers to the user management table 3165 and searches whether the received face image data or the feature data of the face image data is registered as the feature information.

When the user ID can be identified (Y in Act 52), the settlement unit 3144 reads the settlement information from the user management table 3165 and transmits the settlement information to a settlement server or the like of the settlement business operator (Act 53). Subsequently, the settlement unit 3144 determines whether the settlement has been completed based on whether information is received from the settlement server (Act 54).

When the settlement is completed (Y in Act 54), the settlement unit 3144 updates the transaction management table 3167 (Act 55). Specifically, the settlement unit 3144 registers information indicating settlement completion in the settlement flag of the transaction management table 3167. Next, the transmission and reception unit 3141 transmits a transaction completion notification to the user terminal 20 and the mobile sales robot 10 (Act 56). The transmission and reception unit 3141 selects a terminal ID corresponding to an arrival date and time closest to a time point at which the settlement request is received among the terminal IDs corresponding to the robot IDs of the mobile sales robots 10 on which the items are sold in the call management table 3166, and transmits the settlement completion notification to the user terminal 20 having the terminal ID. Then, the control unit 314 ends the settlement.

In Act 52, when the user ID cannot be identified (N in Act 52), that is, when the face image data included in the settlement request or the feature data of the face image data is not registered in the user management table 3165, the transmission and reception unit 3141 transmits error information indicating that the settlement cannot be performed to the mobile sales robot 10 (Act 57). Then, the control unit 314 ends the settlement.

When the settlement is not completed (N in Act 54), the control unit 314 proceeds to Act 57. When the settlement performed by the settlement business operator can not be completed, the transmission and reception unit 3141 transmits error information to the mobile sales robot 10.

The server device 30 performs the settlement processing in response to the settlement request from the mobile sales robot 10. Accordingly, the user can pay the purchase price without having to go to a register counter or the like separately.

As described above, a mobile sales system 1 includes a mobile sales robot 10 with an accommodation portion 111 configured to accommodate items to be sold and a drive unit 123 configured to move the mobile sales robot 10. A user terminal 20 is configured to designate a call position for the mobile sales robot 10. The user terminal 20 includes a transmission and reception unit 2141 configured to transmit position information indicating the call position for the mobile sales robot 10. The mobile sales robot 10 includes a transmission and reception unit 1541 configured to acquire the position information transmitted by the user terminal 20, a drive control unit 1545 configured to control the drive unit 123 based on the position information acquired by the transmission and reception unit 1541, and a payment unit (e.g., an information processing unit 1544) configured to execute payment processing based on merchandise information for any merchandise removed from the accommodation portion 111.

Accordingly, the mobile sales system 1 can move a mobile sales robot 10 on which merchandise is mounted to a position designated by a user and sell the merchandise to the user. A business operator who sells merchandise can broaden sales ranges by adopting the mobile sales system 1.

The user terminal 20 in the mobile sales system 1 according to an embodiment is a terminal device that can be carried by a user, and further includes the self-position identifying unit 2143 configured to identify a self-position (present device location). The transmission and reception unit 2141 is configured to transmit position information indicating a position identified by the self-position identifying unit 2143 as the position information indicating the call position.

Accordingly, the user can call the mobile sales robot 10 without separately performing an operation for inputting the call position to the mobile sales robot 10. Therefore, the mobile sales system 1 can improve user convenience.

The user terminal 20 in the mobile sales system 1 according to an embodiment includes the transmission and reception unit 2141 configured to receive merchandise information for the merchandise mounted on the mobile sales robot 10, and the display control unit 2144 configured to cause the display unit 215 to display the merchandise information received by the transmission and reception unit 2141.

Accordingly, the user can call the mobile sales robot 10 after checking what merchandise is on the mobile sales robot 10. Therefore, the mobile sales system 1 can improve the user convenience in this respect as well.

In addition, the mobile sales robot 10 in the mobile sales system 1 according to an embodiment includes a detection unit (e.g., an information processing unit 1544) configured to detect merchandise taken out from the accommodation portion 111. The payment unit (e.g., an information processing unit 1544) executes the payment processing for the merchandise detected by the detection unit.

Accordingly, the user does not need to perform an operation for separately reading (e.g., scanning) the merchandise information on the merchandise to be purchased. Therefore, the user can more easily shop and pay the purchase price.

The mobile sales robot 10 in the mobile sales system 1 according to an embodiment includes an input unit (e.g., a transmission and reception unit 1541) to which trigger information (e.g., an authentication notification) serving as a condition to start sales can be input, and an alarm unit (e.g., an information processing unit 1544) configured to issue an alarm when it is detected that an item in the accommodation portion 111 has been taken out before the input unit has received the trigger information.

Accordingly, the mobile sales robot 10 can issue an alarm when an item is illegally taken out from the accommodation portion 111 or when it seems the item is about to be taken out. Therefore, security of the mobile sales system 1 can be improved.

In an embodiment, control programs executed by the mobile sales robot 10, the user terminal 20, and the server device 30 may be provided by being recorded in a computer-readable recording medium such as a CD-ROM. The control programs executed by each of the devices may be stored in a computer connected to a network such as the Internet and provided by being downloaded via the network, or may be accessed via the network such as the Internet.

While the embodiment is described above, the embodiment is presented as an example only, and is not intended to limit the scope of the disclosure. The above-described embodiment can be implemented in various other forms, and various omissions, substitutions, and changes can be made without departing from the spirit of the disclosure. The embodiment and a modification thereof are included in the scope and gist of the disclosure, and are included in the scope of the disclosure disclosed in the scope of claims and equivalent scope thereof.

What is claimed is:

1. A mobile sales system, comprising:
   a mobile sales device on which items to be sold can be mounted; and
   a terminal device to designate a customer call position for the mobile sales device, wherein
   the terminal device is configured to:
      transmit position information indicating the customer call position, and
   the mobile sales device is configured to:
      acquire the position information transmitted by the terminal device,
      move to a location corresponding to the acquired position information,
      transmit an arrival notification upon arriving at the location,
      require an input of authentication information before permitting a sales transaction start,
      issue an alarm if any item is removed from the mobile sales device before the authentication information has been input, and
      execute payment processing for an item removed from the mobile sales device by a customer, wherein
   the terminal device is further configured to display a sales transaction start time limit screen indicating an elapse of a predetermined period of time from the transmitting of the arrival notification by the mobile sales device.

2. The mobile sales system according to claim 1, wherein the terminal device is a mobile device carried by the customer.

3. The mobile sales system according to claim 2, wherein
   the terminal device comprises a self-location unit configured to identify a current position of the terminal device, and
   the position information transmitted by the terminal device is the current position of the terminal device.

4. The mobile sales system according to claim 1, wherein the terminal device is further configured to:
   receive merchandise information about items mounted on the mobile sales device, and
   cause a display unit of the terminal device to display the received merchandise information.

5. The mobile sales system according to claim 1, wherein the mobile sales device is further configured to:
   detect each item removed from the mobile sales device, and
   receive payment for each item detected as removed from the mobile sales device.

6. The mobile sales system according to claim 1, wherein the mobile sales device is a wheeled robot.

7. The mobile sales system according to claim 1, wherein the mobile sales device includes:
   a merchandise display portion on which items are mounted, and
   a moving unit below the merchandise display portion which moves the mobile sales device from place to place.

8. The mobile sales system according to claim 1, further comprising:
   a server configured to connect to the mobile sales device and the terminal device via a network, wherein the server is configured to:
   receive a selection of one of a plurality of mobile sales devices from the terminal device along with the position information indicating the call position,
   transmit the position information to the selected one of the plurality of mobile sales devices, and
   receive the arrival notification from the mobile sales device and transmit a corresponding notification to the terminal device to cause the terminal device to display the sales transaction start time limit screen.

9. A mobile sales system, comprising:
   a plurality of mobile robots on which items to be sold can be mounted;
   a server device connected to the plurality of mobile robots via a network connection;
   a terminal device to designate a customer call position for a mobile robot of the plurality of mobile robots, wherein
   the terminal device is configured to:
      transmit position information indicating the customer call position to the server device, and
   each mobile robot is configured to:
      acquire the position information transmitted by the terminal device to the server,
      move to a location corresponding to the acquired position information,
      transmit an arrival notification upon arriving at the location to the server device,
      require an input of authentication information before permitting a sales transaction start,
      issue an alarm if any item is removed from the mobile robot before the authentication information has been input, and
      execute payment processing for an item removed from the mobile robot by a customer, wherein
   the terminal device is further configured to display a sales transaction start time limit screen indicating an elapse of a predetermined period of time from the transmitting of the arrival notification by the mobile robot based on a notification of arrival from the server device.

10. The mobile sales system according to claim 9, wherein the terminal device is further configured to:
   receive merchandise information about items mounted on each of the mobile robots in the plurality of mobile robots, and
   cause a display unit of the terminal device to display the received merchandise information.

11. The mobile sales system according to claim 9, wherein each mobile robot is further configured to:
   detect any item being removed from the mobile robot, and
   receive payment for each item detected as removed from the mobile robot.

12. The mobile sales system according to claim 9, wherein each mobile robot is a wheeled robot.

13. The mobile sales system according to claim 9, wherein each mobile robot includes:
- a merchandise display portion on which items are mounted, and
- a moving unit below the merchandise display portion which moves the mobile robot from place to place.

14. A server device for use in a mobile sales system comprising a mobile sales device on which items to be sold can be mounted and a terminal device configured to designate a customer call position, the server device comprising:
- a communication interface to connect to a terminal device and a mobile sales device; and
- a processor configured to:
  - receive a selection indicating a mobile sales device and position information indicating the customer call position for the mobile sales device,
  - transmit the position information received from the terminal device to the selected mobile sales device,
  - receive an arrival notification from the selected mobile sales device indicating an arrival of the selected mobile sales device at a location corresponding to the customer call position, and
  - upon receiving the arrival notification, send a notification of arrival to the terminal device that causes the terminal device to display a sales transaction start time limit screen indicating an elapse of predetermined period of time from the transmitting of the arrival notification by the selected mobile sales device.

15. The server device according to claim 14, wherein the processor is further configured to send authentication information to the terminal device after receiving the selection indicating the mobile sales device and the position information.

16. The server device according to claim 14, wherein the processor is further configured to send merchandise information indicating items mounted on the mobile sales device to the terminal device.

17. The server device according to claim 14, wherein the processor is further configured to perform settlement processing for any items removed from the mobile sales device.

18. The mobile sales system according to claim 1, wherein the mobile sales device is further configured to cancel a sales transaction request at the location upon the elapse of the predetermined period of time.

19. The mobile sales system according to claim 9, wherein each mobile robot is further configured to cancel a sales transaction request at the location upon the elapse of the predetermined period of time.

20. The server device according to claim 14, wherein the processor is further configured to cancel a sales transaction request at the location upon the elapse of the predetermined period of time.

* * * * *